(12) United States Patent
Blauer et al.

(10) Patent No.: US 7,234,205 B2
(45) Date of Patent: *Jun. 26, 2007

(54) PLIABLE HANDLE

(75) Inventors: Stan Blauer, Portland, OR (US); Jeff Blauer, Portland, OR (US); Yen Chiu Chan, Taipei (TW); Fu-Yi Chou, Taipei (TW)

(73) Assignee: Shedrain Corporation, Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/209,277

(22) Filed: Aug. 22, 2005

(65) Prior Publication Data

US 2006/0021196 A1 Feb. 2, 2006

Related U.S. Application Data

(63) Continuation-in-part of application No. 10/418,811, filed on Apr. 17, 2003, now Pat. No. 6,968,599, which is a continuation-in-part of application No. 10/693,152, filed on Oct. 23, 2003, now Pat. No. 6,959,469.

(60) Provisional application No. 60/603,945, filed on Aug. 22, 2004.

(51) Int. Cl.
*A45C 7/00* (2006.01)
*E05B 1/00* (2006.01)

(52) U.S. Cl. .................. 16/431; 16/436; 16/421; 16/DIG. 12; 16/DIG. 19; 81/489; 81/177.1; 135/25.4

(58) Field of Classification Search ............ 16/430, 16/431, 435, 436, 421, DIG. 12, DIG. 18, 16/DIG. 19; 15/143.1, 144.1, 145, 443; 81/177.1, 177.6, 489; 74/551.1, 557, 558, 74/551.9; 401/6–8, 88; 156/218, 212; 473/300–303; 30/322, 323, 340; 135/24, 25, 25.41, 25.4; D3/5–6, 10, 12
See application file for complete search history.

(56) References Cited

U.S. PATENT DOCUMENTS

| 2,205,769 | A | 6/1940 | Sweetland |
| 2,312,041 | A | 2/1943 | Lillie |
| 4,035,089 | A | 7/1977 | Schwartz et al. |
| 4,044,625 | A | 8/1977 | D'Haem et al. |
| 4,338,270 | A | 7/1982 | Uffindell |
| 4,617,697 | A | 10/1986 | David |
| 4,660,832 | A | 4/1987 | Shomo |
| D290,905 | S | 7/1987 | Selig |

(Continued)

FOREIGN PATENT DOCUMENTS

| DE | 003345641 A1 | 6/1985 |
| DE | 003809558 A1 | 10/1989 |
| DE | 4030133 A1 | 4/1991 |
| DE | 10309535 A1 | 10/2003 |
| EP | 519312 A1 | 12/1992 |

(Continued)

*Primary Examiner*—Chuck Y. Mah
(74) *Attorney, Agent, or Firm*—Schweitzer Cornman Gross & Bondell LLP

(57) ABSTRACT

A pliable handle for a hand-held device is provided. The handle includes a tubular core member, a deformable outer sheath disposed about the tubular core member, a gel disposed between the tubular core member and the outer sheath, and first and second sealers inserted into respective ends of the tubular core member and sealing the gel between the tubular core member and the outer sheath, wherein a force applied to the outer sheath causes load movement of the gel.

22 Claims, 20 Drawing Sheets

U.S. PATENT DOCUMENTS

| | | |
|---|---|---|
| 4,719,063 A | 1/1988 | White |
| 4,911,569 A | 3/1990 | Hashimoto et al. |
| 4,934,024 A | 6/1990 | Sexton |
| 4,934,066 A | 6/1990 | Rose |
| 4,953,861 A | 9/1990 | Nakanishi |
| 4,964,192 A | 10/1990 | Marui |
| 5,000,599 A | 3/1991 | McCall et al. |
| 5,088,734 A | 2/1992 | Glava |
| 5,155,878 A | 10/1992 | Dellis |
| 5,180,163 A | 1/1993 | Lanctot et al. |
| 5,193,246 A | 3/1993 | Huang |
| 5,197,732 A | 3/1993 | Lanctot |
| 5,203,561 A | 4/1993 | Lanctot |
| 5,355,552 A | 10/1994 | Huang |
| 5,458,144 A | 10/1995 | Lavine |
| 5,633,286 A | 5/1997 | Chen |
| 5,655,975 A | 8/1997 | Nashif |
| 5,713,104 A | 2/1998 | Grampaolo, Jr. |
| 5,865,180 A | 2/1999 | Sigfrid |
| 5,876,134 A | 3/1999 | Tseng et al. |
| 5,944,617 A | 8/1999 | Falone et al. |
| 5,970,581 A | 10/1999 | Chadwick et al. |
| 6,019,534 A | 2/2000 | Heins |
| 6,049,936 A | 4/2000 | Holley |
| 6,094,781 A | 8/2000 | Jansson et al. |
| 6,148,483 A | 11/2000 | DeGraff |
| 6,158,910 A | 12/2000 | Jolly et al. |
| 6,390,704 B1 | 5/2002 | Baudino et al. |
| 6,447,190 B1 | 9/2002 | Kwitek |
| 6,511,387 B2 | 1/2003 | Grieb |
| 6,591,456 B2 | 7/2003 | DeLuca et al. |
| 6,647,582 B1 | 11/2003 | Rechelbacher |
| 6,793,426 B2 | 9/2004 | Willat |
| 2002/0020537 A1 | 2/2002 | Shonfeld et al. |
| 2002/0119270 A1 | 8/2002 | Daniel, Jr. |
| 2002/0168214 A1 | 11/2002 | Carullo et al. |
| 2003/0005549 A1 | 1/2003 | DeLuca et al. |
| 2003/0024543 A1 | 2/2003 | Wolf |
| 2003/0029002 A1 | 2/2003 | Wilat |
| 2003/0040384 A1 | 2/2003 | Falone et al. |
| 2003/0051316 A1 | 3/2003 | Wilsat |
| 2003/0110585 A1* | 6/2003 | Rechelbacher ............ 15/143.1 |
| 2004/0064913 A1* | 4/2004 | Willat ........................ 15/443 |
| 2006/0124158 A1* | 6/2006 | Lin et al. ..................... 135/24 |
| 2006/0174450 A1* | 8/2006 | Chen ........................... 16/436 |

FOREIGN PATENT DOCUMENTS

| | | |
|---|---|---|
| EP | 0519312 A1 | 12/1992 |
| FR | 000838175 A1 | 4/1998 |
| JP | 4072-05055 A | 8/1995 |
| JP | 07205055 A | 8/1995 |
| JP | 10195745 A | 7/1998 |
| WO | WO 0032715 A1 | 6/2000 |
| WO | WO 0230731 A1 | 4/2002 |
| WO | WO 02081294 A1 | 10/2002 |

* cited by examiner

TO APPARATUS

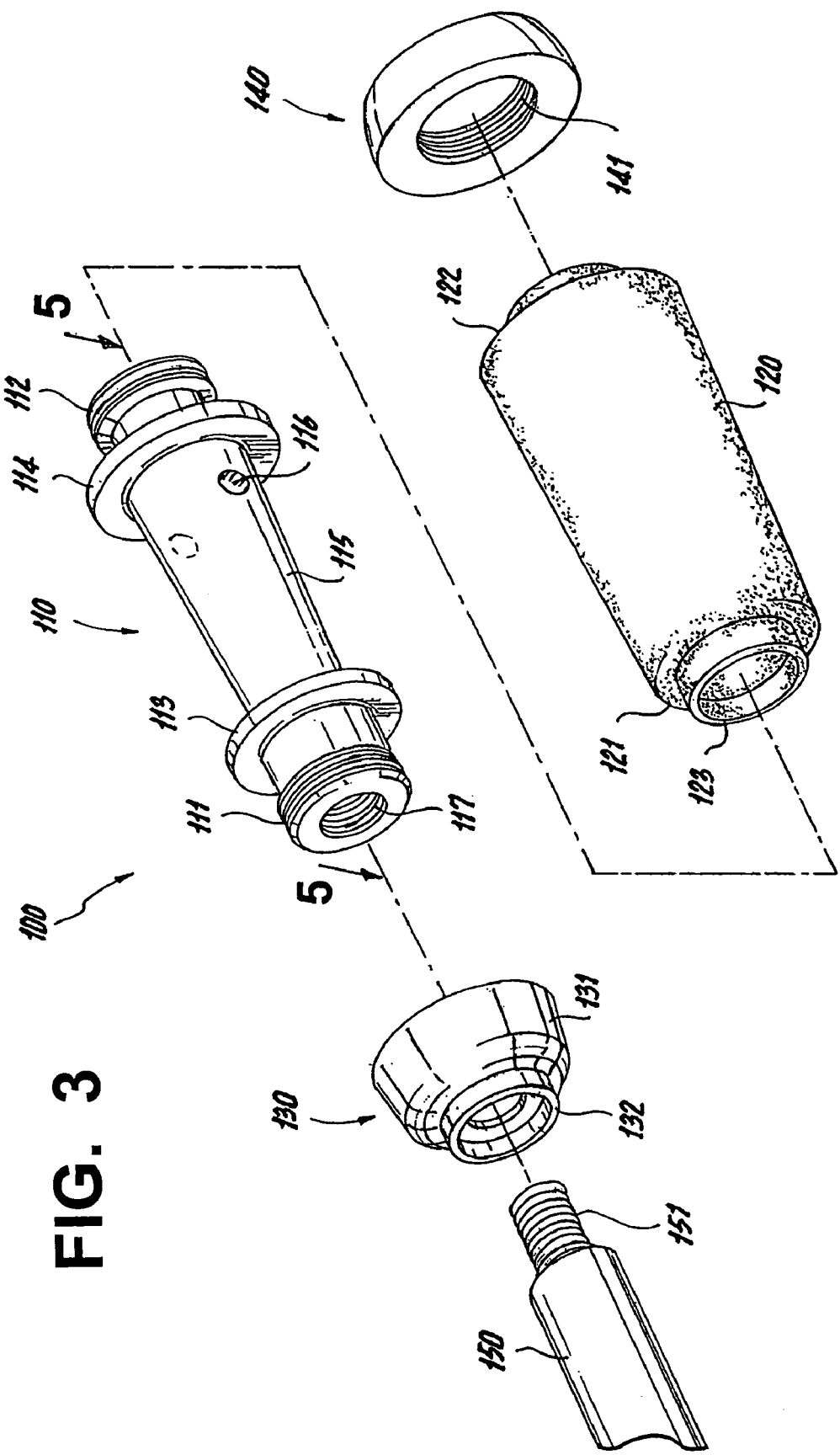

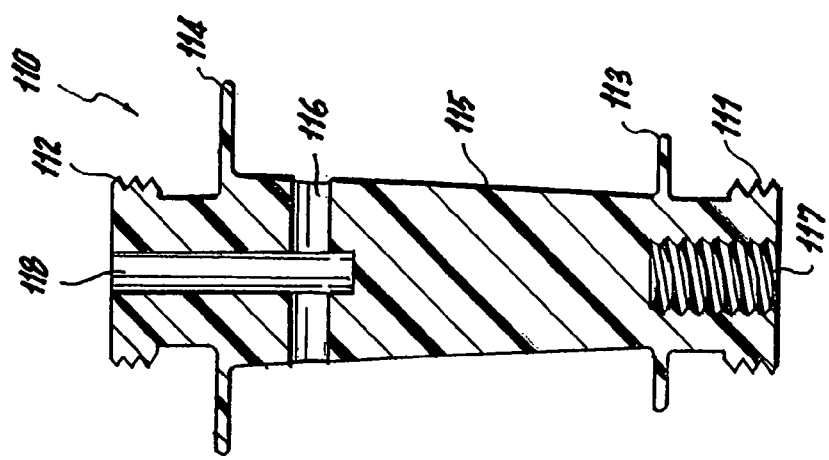
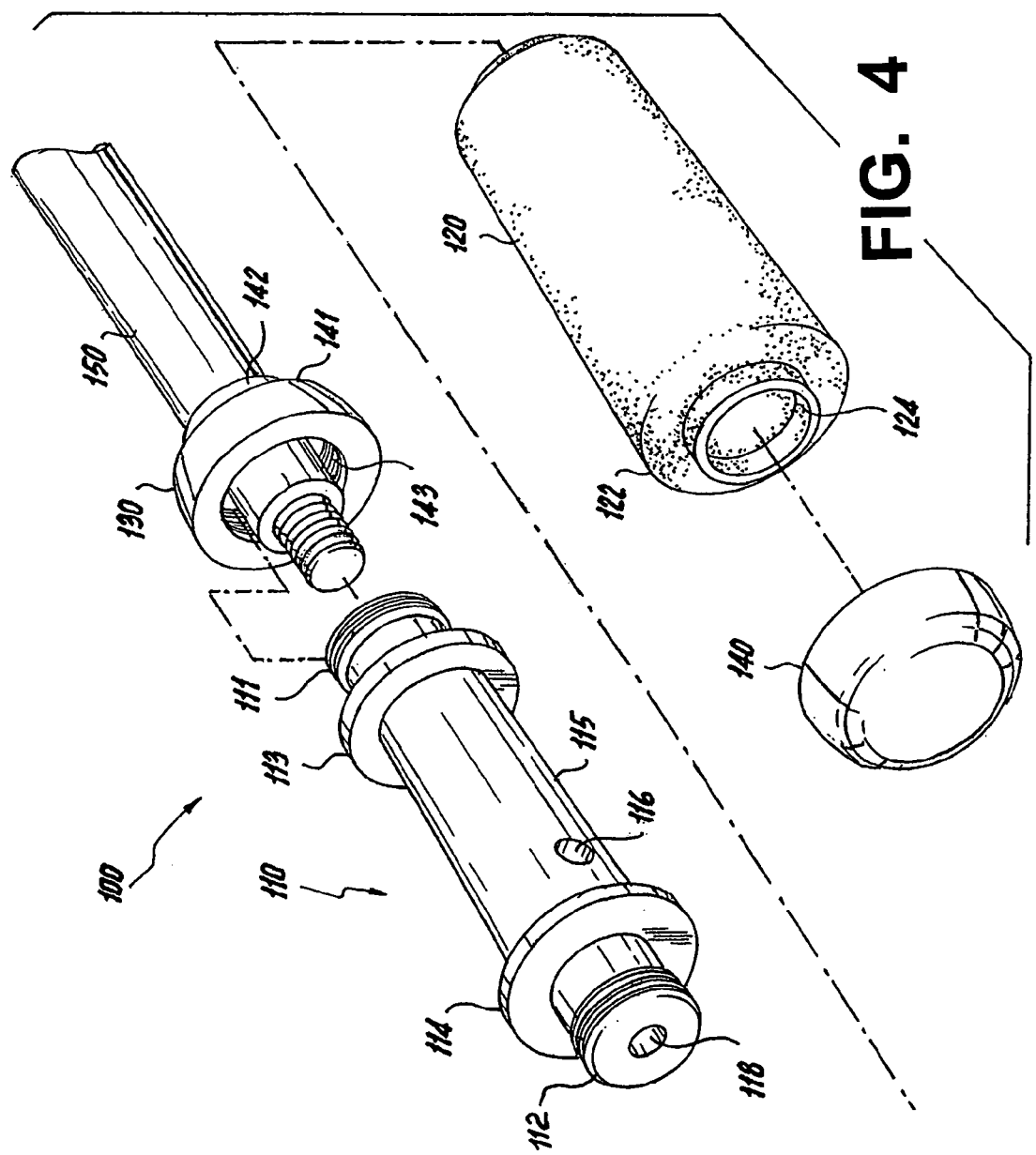

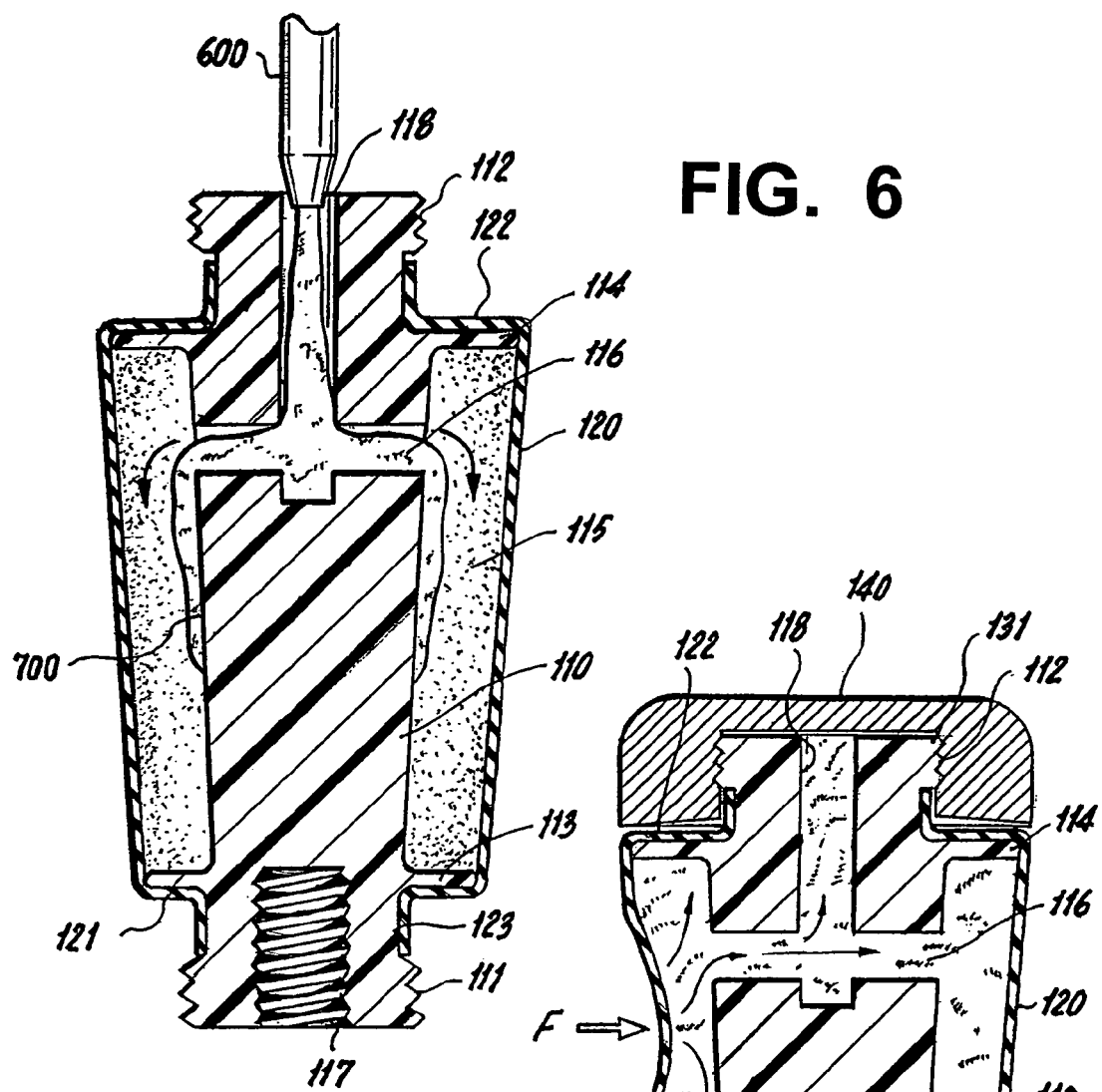
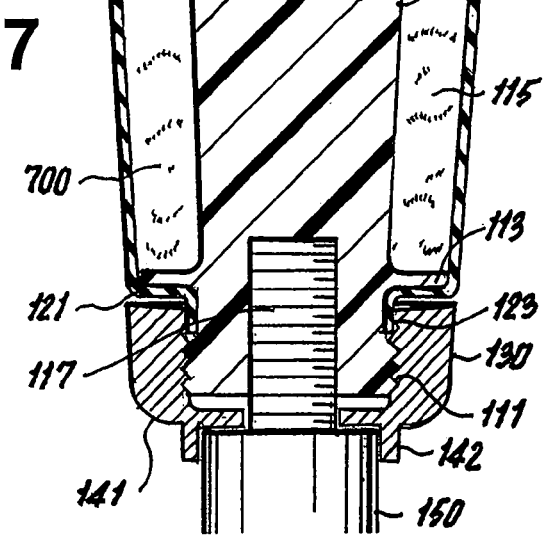
FIG. 6
FIG. 7

FIG. 13
FIG. 14
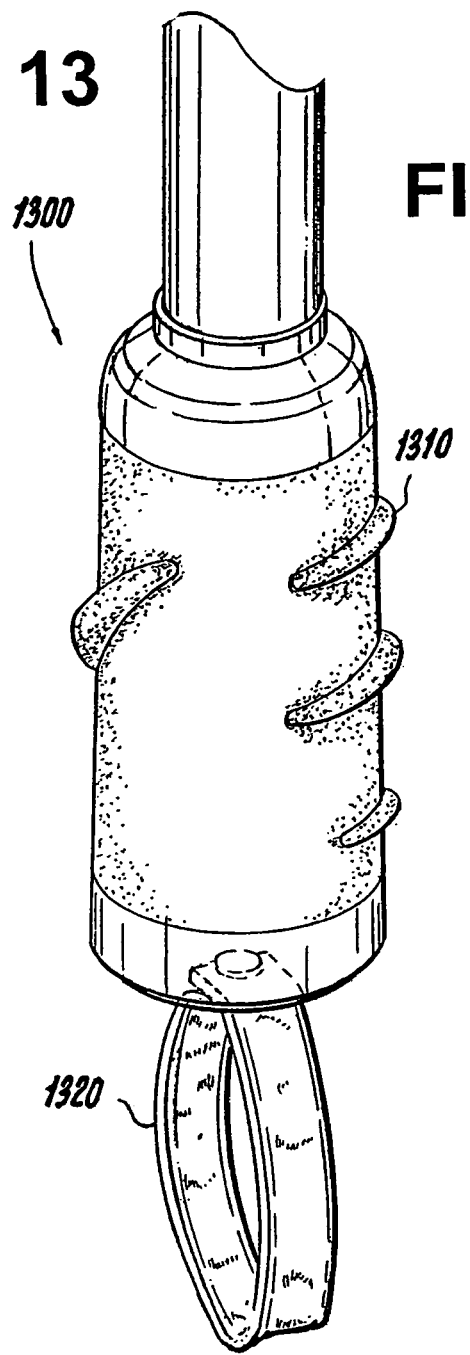
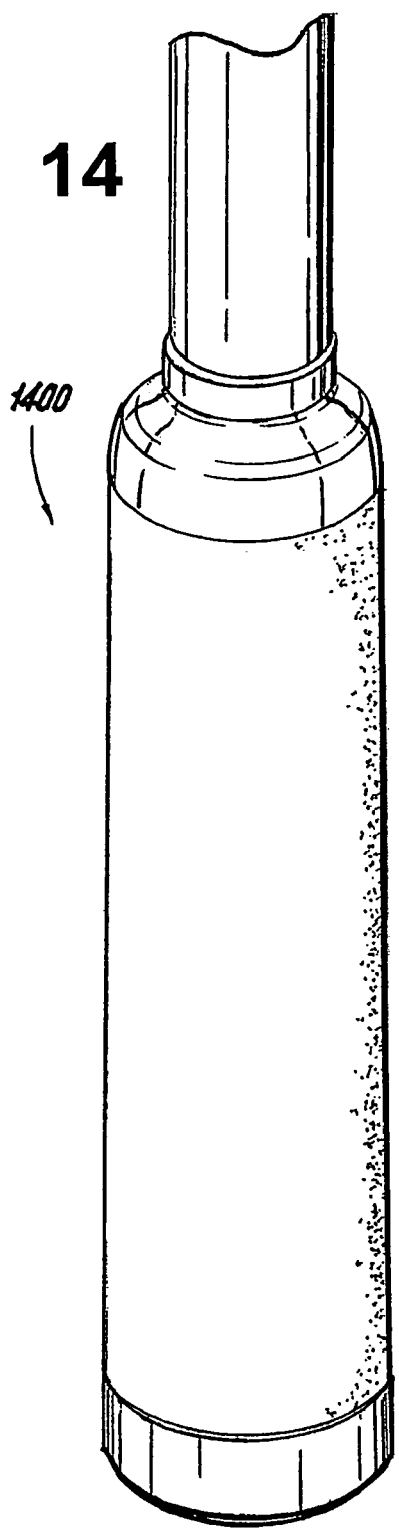

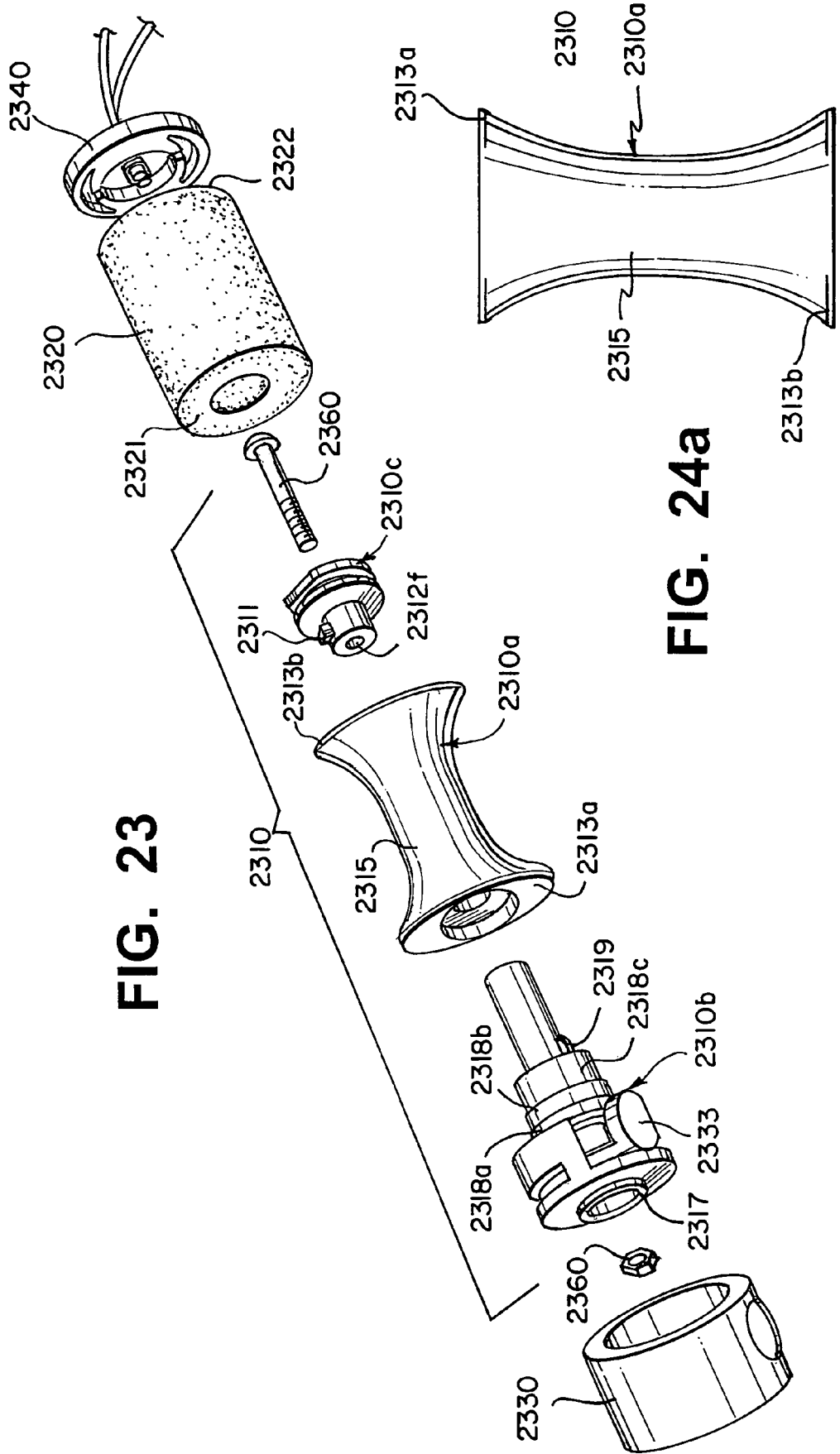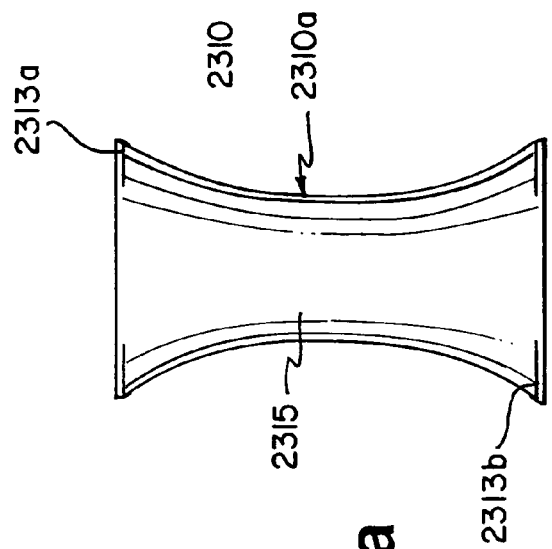

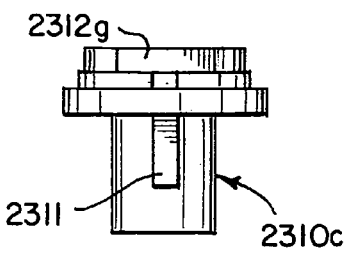
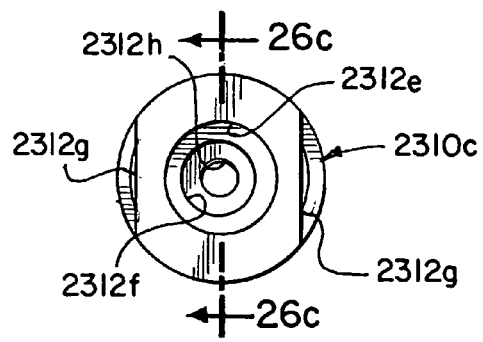
FIG. 26a
FIG. 26b
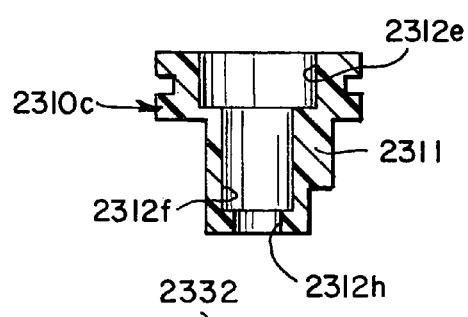
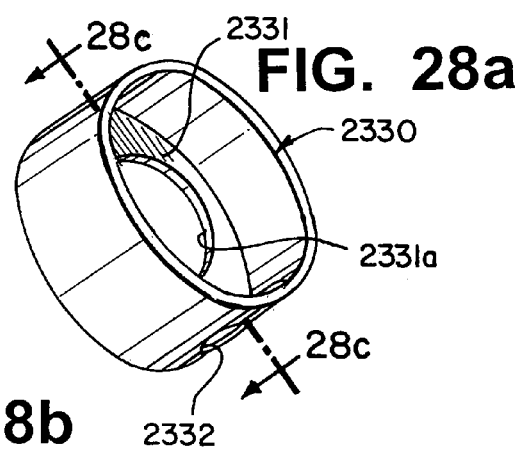
FIG. 26c
FIG. 28a
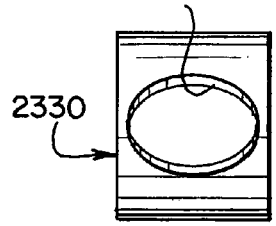
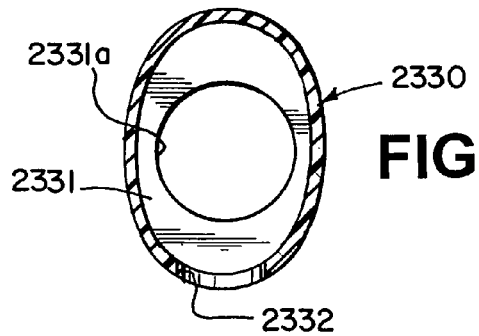
FIG. 28b
FIG. 28c
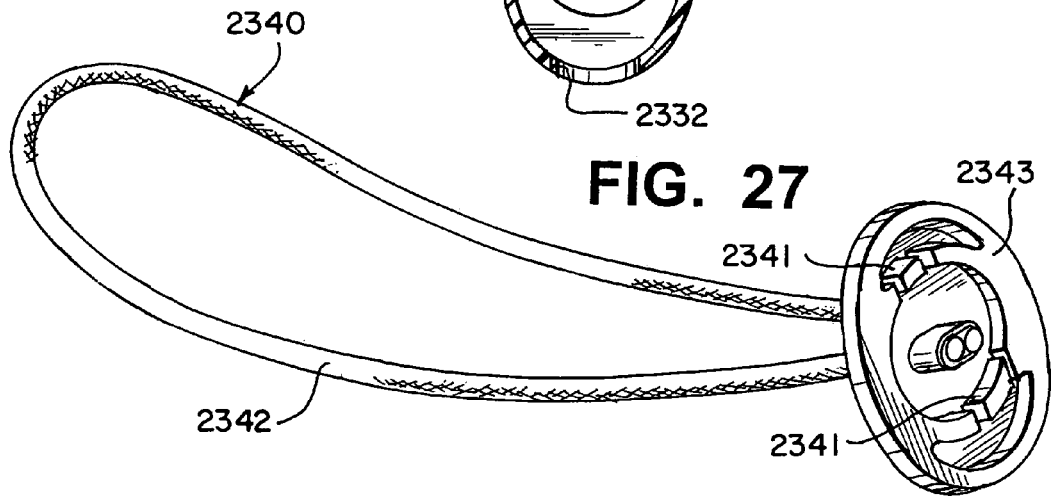
FIG. 27

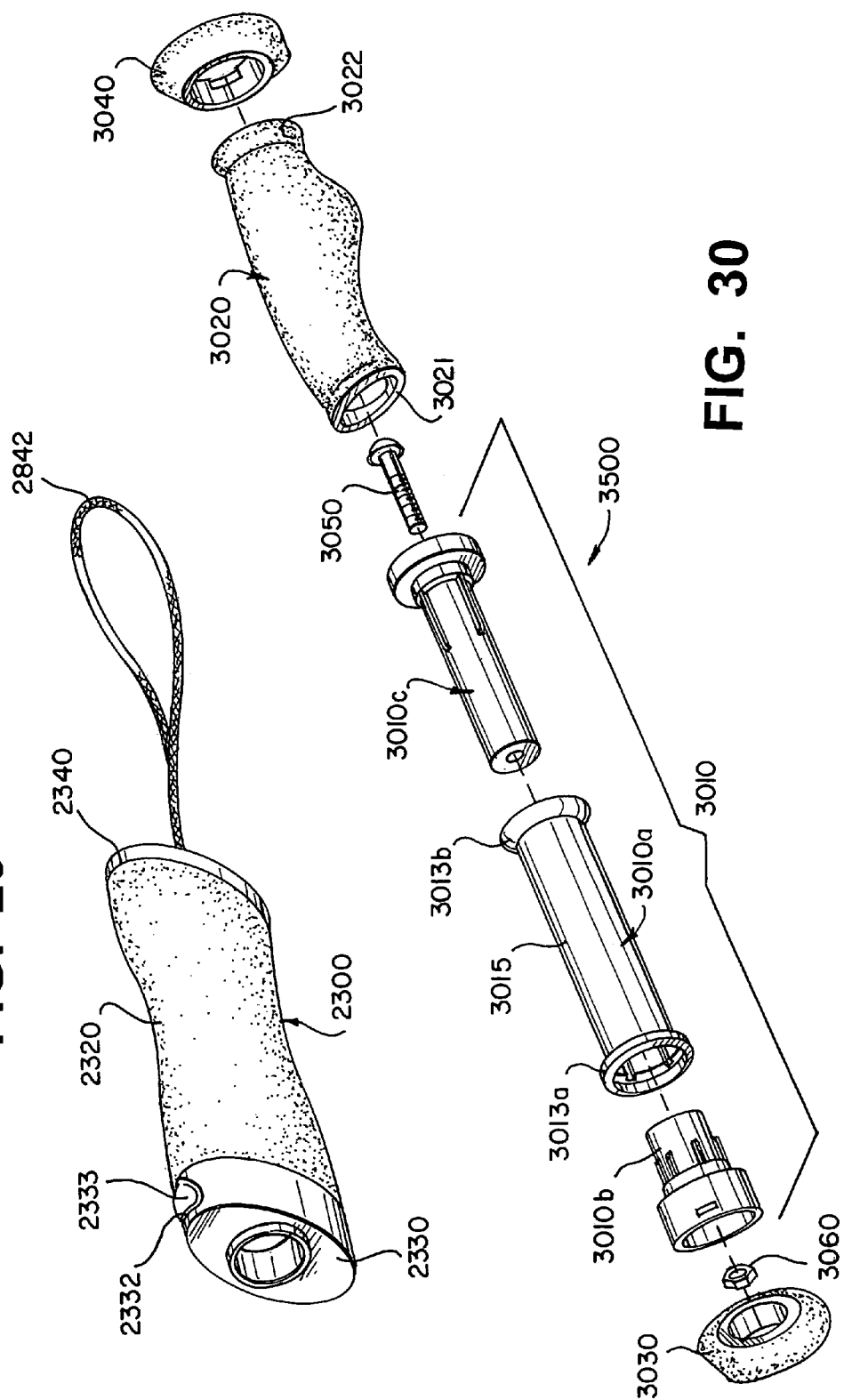

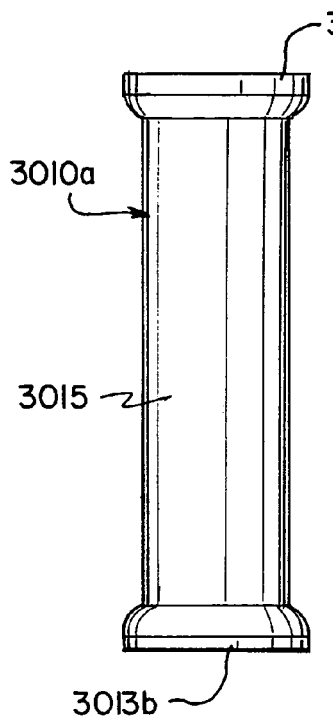
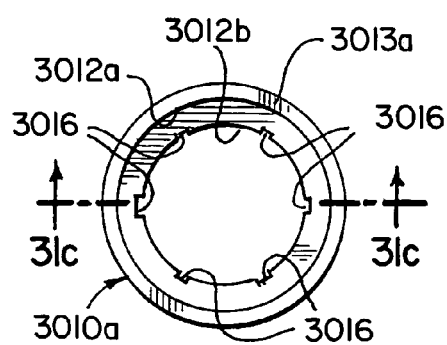
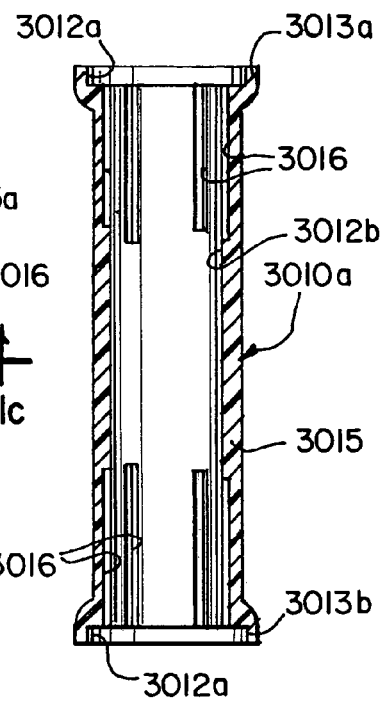
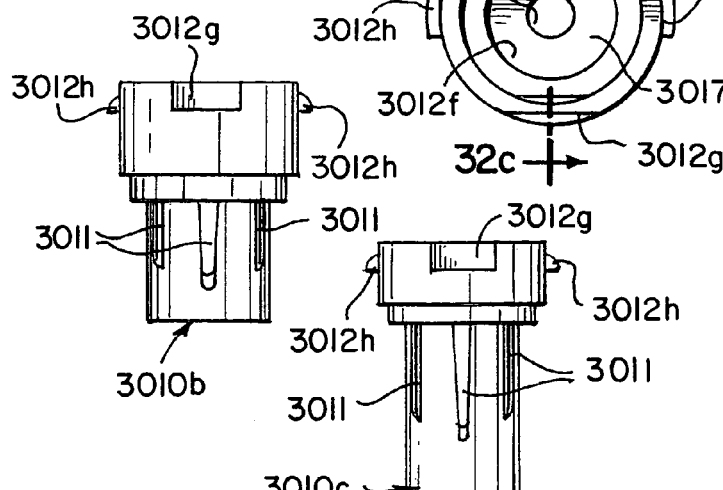
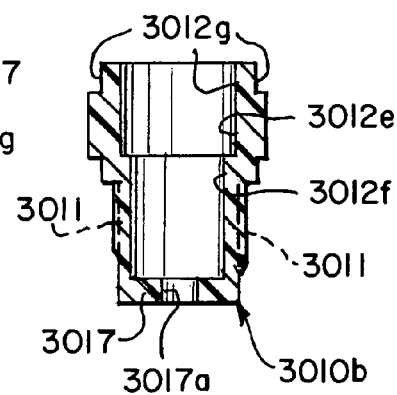
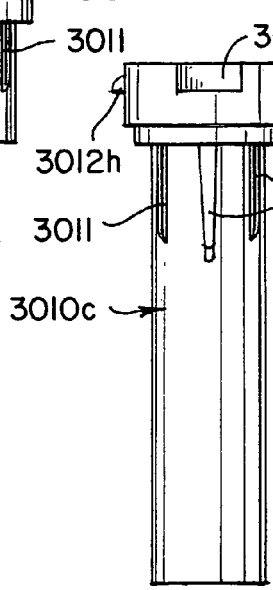

PLIABLE HANDLE

RELATED APPLICATIONS

This application claims priority to provisional patent application Ser. No. 60/603,945, filed on Aug. 22, 2004, and is a continuation-in-part of U.S. patent application Ser. No. 10/693,152, filed on Oct. 23, 2003 now U.S. Pat. No. 6,959,469, which is a continuation-in-part of U.S. patent application Ser. No. 10/418,811, filed on Apr. 17, 2003 now U.S. Pat. No. 6,968,599. These related applications are hereby each incorporated by reference in their entireties.

TECHNICAL FIELD

The present invention relates generally to handles, and more particularly to handles that are pliable.

BACKGROUND

Handles of devices, such as umbrellas, canes, walking sticks, sports equipment, garden equipment, tools, kitchen tools, cleaning equipment, writing instruments, beauty equipment, etc., have been known for many years. Users are often required to grip such handles for an extended period of time leading to discomfort.

Umbrellas, for example, which are used for protection from elements such as rain and sun, generally consist of a collapsible canopy mounted on one end of a central rod and a handle mounted on the other end. During inclement weather especially, users tend to grip the handle tightly. The stiff, rigid handle promotes finger fatigue. Also, plastic handles tend to become slippery when wet, and the user might lose grasp of the handle. And in high winds, this could lead to loss of the umbrella.

Other types of handles also suffer from similar problems of causing finger fatigue and becoming slippery when wet. It is therefore desirable to overcome the above disadvantages by providing a handle that will reduce hand fatigue and provide a more comfortable, secure grip.

SUMMARY

A pliable handle for a hand-held device is provided. The handle includes a tubular core member, a deformable outer sheath disposed about the tubular core member, a gel disposed between the tubular core member and the outer sheath, and first and second sealers inserted into respective ends of the tubular core member and sealing the gel between the tubular core member and the outer sheath, wherein a force applied to the outer sheath causes load movement of the gel.

Further aspects and features of the exemplary apparatus disclosed herein can be appreciated from the appended Figures and accompanying written description.

BRIEF DESCRIPTION OF THE DRAWINGS

The invention will be more fully understood by reference to the following drawings which are for illustrative purposes only:

FIG. 3 is a front exploded perspective view of the pliable handle of FIG. 1;

FIG. 4 is a rear exploded perspective view of the pliable handle of FIG. 1;

FIG. 5 is a cross-sectional view of the core member taken along line 5—5 of FIG. 3;

FIG. 6 is a cross-sectional view of the assembled pliable handle of FIG. 1 illustrating movement of gel during injection;

FIG. 7 is a cross-sectional view of the assembled pliable handle of FIG. 1 illustrating movement of gel while a force exerting pressure is applied to the handle;

FIG. 13 is a perspective view of a third exemplary embodiment of the pliable handle having a modified sheath and a loop for hanging;

FIG. 14 is a perspective view of a fourth exemplary embodiment of the pliable handle elongated for two-handed gripping;

FIG. 23 is a front exploded perspective view of a ninth exemplary embodiment of the pliable handle;

FIG. 24*a* is a front elevation view of the core member main portion of the pliable handle of FIG. 23;

FIG. 26*a* is a front elevation view of the core member distal sealing portion of the pliable handle of FIG. 23;

FIG. 26b is a top plan view of the core member distal sealing portion of the pliable handle of FIG. 23;

FIG. 26c is a cross-sectional view taken substantially along line 26c—26c in FIG. 26b;

FIG. 27 is perspective view of the distal end cap of the pliable handle of FIG. 23;

FIG. 28a is a perspective view of the proximal end cap of the pliable handle of FIG. 23;

FIG. 28b is a bottom plan view of the proximal end cap of the pliable handle of FIG. 23;

FIG. 28c is a cross-sectional view taken substantially along line 28c—28c of FIG. 28a;

FIG. 29 is a perspective view of the assembled pliable handle of FIG. 23;

FIG. 30 is an exploded perspective view of a tenth exemplary embodiment of the pliable handle;

FIG. 31a is a front elevation view of the core member main portion of the pliable handle of FIG. 30;

FIG. 31b is a top plan view of the core member main portion of the pliable handle of FIG. 30;

FIG. 31c is a cross-sectional view taken substantially along line 31c—31c of FIG. 31b;

FIG. 32a is a front elevation view of the core member proximal sealing portion of the pliable handle of FIG. 30;

FIG. 32b is a top plan view of the core member proximal sealing portion of the pliable handle of FIG. 30;

FIG. 32c is a cross-sectional view taken substantially along line 32c—32c of FIG. 31b;

FIG. 33 is a front elevation view of the core member distal sealing portion of the pliable handle of FIG. 30;

DETAILED DESCRIPTION OF THE PREFERRED EMBODIMENTS

Figure 1:
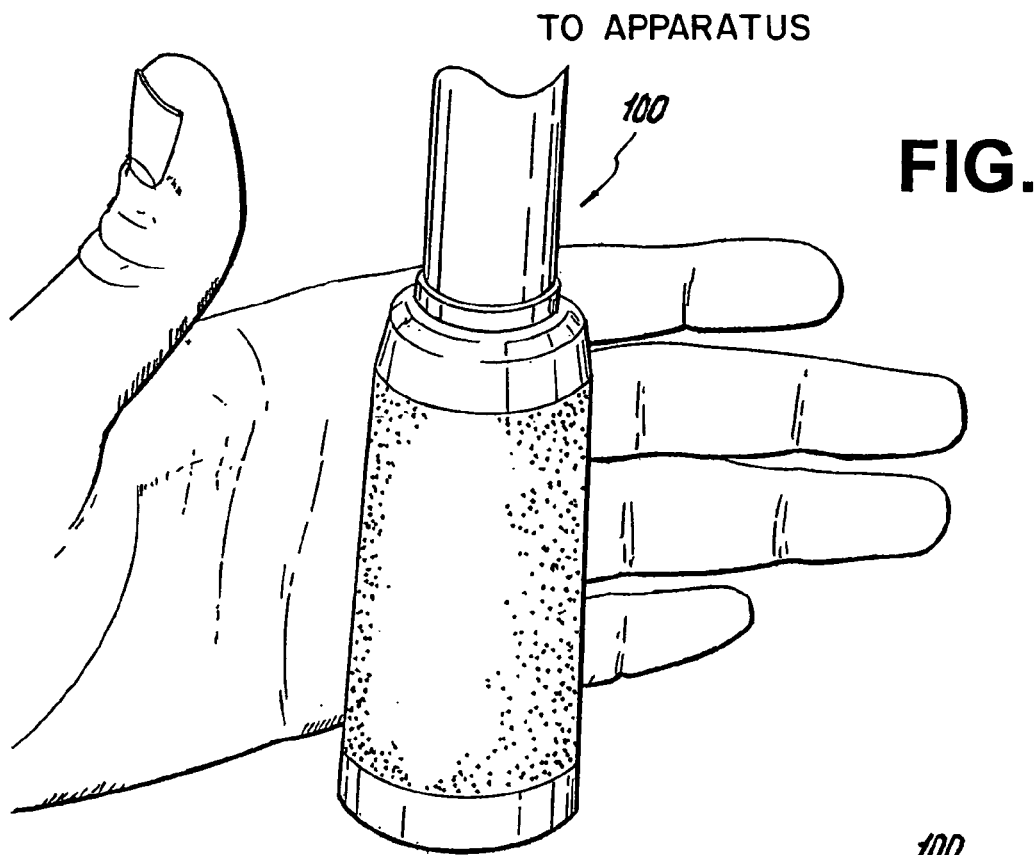
FIG. 1 is a perspective view of a pliable handle according to one exemplary embodiment.
Figure 2:
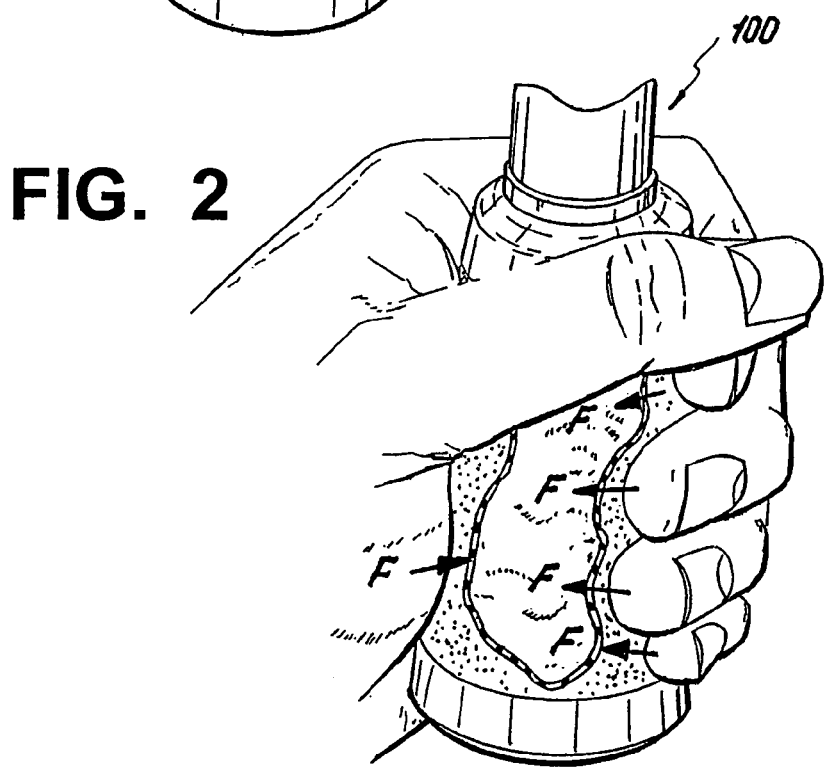
FIG. 2 is a perspective view showing the pliable handle of FIG. 1 in partial cutaway and being gripped by a hand.

FIG. 1 is a perspective view of a pliable handle 100 according to one exemplary embodiment. FIG. 2 is a perspective view showing the pliable handle 100 in partial cutaway and being gripped by a hand. As the hand grips the pliable handle 100, forces applied in directions indicated by the arrows cause the pliable handle to deform and conform to the shape of the hand. The pliable handle 100 has a so-called memory effect, meaning that after the grip on the handle is released and the forces are removed, the deformation in the handle will remain for a period of time before the handle returns to its original shape.

FIG. 3 is a front exploded perspective view of the pliable handle 100, and FIG. 4 is a rear exploded perspective view of the pliable handle 100. The pliable handle 100 is configured to be securely yet removably attached to a pole 150 (which is not part of the present invention) and is generally formed of a core member 110, an outer sheath 120, a proximal end cap 130, and a distal end cap 140.

One exemplary core member 110 is formed in a substantially cylindrical shape (but can be any other suitable shape) with proximal and distal threaded portions 111, 112 formed on an outer surface of proximal and distal ends, respectively. Proximal and distal annular flanges 113, 114, which partially define a gel-containing portion 115 therebetween, are provided on the outer surface of the core member 110 at a location slightly inward along the longitudinal axis of the core member 110 from the respective proximal and distal threaded portions 111, 112. The diameters of the proximal and distal annular flanges 113, 114 can be the same or different, depending on the desired shape of the pliable handle 100. A gel-directing through bore 116 is formed through the core member 110 at a position closer to the distal threaded portion 112 than the proximal threaded portion 111, and the longitudinal axis of the gel-directing through bore 116 is substantially perpendicular to the longitudinal axis of the core member 110. In other words, the gel-directing through bore 116 is formed proximate the distal annular flange 114 and within the gel-containing portion 115. It is appreciated by those skilled in the art that the position and size of the gel-directing through bore 116 may be modified provided that the modification results in a gel-directing through bore suitable for the intended purpose. A threaded bore 117 is formed in the proximal end of the core member 110 and is designed to threadingly mate with the pole 150 or other device to which the pliable handle of the present invention may be attached. Alternatively, the handle 100 may be designed to be attached to the pole 150 or other device by any other suitable attaching means, such as rivets, adhesive, tension fit, etc.

FIG. 5 illustrates a cross-sectional view of the core member 110 taken along the line 5—5 of FIG. 3. The core member 110 has formed therein a gel injection bore 118, which is open at the distal end of the core member 110 and is in communication with the through bore 116. In one embodiment, the gel injection bore 118 intersects the through bore 116 at approximately the center thereof. The longitudinal axis of the gel injection bore 118 is substantially perpendicular to the longitudinal axis of the through bore 116. As will be described in detail further below, the gel injection bore 118 and through bore 116 are used to receive and direct gel during the handle assembly process. It is appreciated by those skilled in the art that the number, positions and sizes of these bores may be modified provided that the modification results in bores that are suitable for the intended purpose. The core member 110 can be formed of PVC, ABS, PE or PP plastic, or any other suitable material.

Referring again to FIGS. 3 and 4, the outer sheath 120 is provided over the core member 110 such that the sheath is uniformly disposed about the core member 110. Together the outer sheath 120 and the core member 110 define the gel-containing portion 115 therebetween. That is, the gel-containing portion 115 is defined at its ends by the proximal and distal annular flanges 113, 114 of the core member 110, and at its longitudinal faces by the base of the core member 110 and the outer sheath 120.

The outer sheath 120 is substantially cylindrical in shape and has at its ends a proximal shoulder 121 and a distal shoulder 122, respectively, which may or may not be flanged. The diameter of each of the proximal and distal shoulders 121, 122 corresponds with the diameter of the respective proximal and distal annular flanges 113, 114 of the core member 110, such that when the pliable handle 100 is assembled, the proximal and distal shoulders 121, 122 form gel seals with the proximal and distal annular flanges 113, 114, respectively, due to the intimate fit between these members. Finally, proximal and distal annular lips (rings) 123, 124 define holes provided at the proximal and distal ends, respectively, of the outer sheath 120. When the pliable handle 100 is assembled, the proximal and distal threaded portions 111, 112 of the core member 110 project through the holes defined by the annular lips 123, 124, respectively.

In one preferred embodiment, the outer sheath 120 is formed of vulcanized silicone. Alternatively, the outer sheath 120 may be formed of any other deformable material suitable for the intended purpose. The sheath 120 has a thickness that is great enough to resist breakage, but thin enough to be pliable and readily deformable under the normal handling of a user. Also, the sheath 120 may be colorless, or alternatively may be formed of any of a number of different colors, including a solid color or a multicolored pattern. The sheath 120 may also be transparent or alternatively, opaque. Moreover, the sheath 120 can contain a decorative pattern or other indicia, such as a company logo.

Distal end cap 140 is circular in shape and has an outer diameter that is substantially similar to the diameter of the shoulder 122 of the distal end portion of the outer sheath 120. The bottom end cap 140 has an open end and a closed end. Formed in the open end is a threaded bore 141 designed to secure the cap 140 to the distal threaded portion 112 of the core member 110.

Proximal end cap 130 is circular in shape and has two open ends. The proximal open end of the cap 130 has a shoulder 131. An annular lip 132, which has a diameter that is smaller than that of the shoulder 131, defines a hole and is located concentric with the shoulder 131. The diameter of the distal end of the proximal end cap 130 is larger than the diameter of the proximal end, and is substantially similar to the diameter of the proximal shoulder 121 of the outer sheath 120. Formed in the inner circumference of the distal open end of the proximal end cap 130 are threaded bores 131 designed to secure the cap 130 to the proximal threaded portion 111 of the core member 110.

After assembly, the pliable handle 100 can be secured to a device, such as pole 150 having a threaded end 151. The threaded end 151 is passed through the proximal end cap 130 hole defined by the annular lip 132 and through the outer sheath 120 hole defined by the proximal annular lip 123, and then the threaded end 151 of the pole 150 is screwed into the threaded bore 117 formed in the proximal end of the core member 110.

The distal end cap 140 and proximal end cap 130 may be modified in shape, color, or size, provided that the caps are suitable for their intended purpose. The caps 140, 130 may be made of ABS plastic or any other suitable material. Also, the caps 140, 130 may be colorless, or alternatively may be formed of any of a number of different colors, including a solid color or a multicolored pattern. The caps 140, 130 may also be transparent or alternatively, opaque. It should also be noted that the components of the handle may be modified such that the caps 140, 130 are secured to the handle by a means other than screwing.

One exemplary method for assembling the pliable handle 100 will now be described with reference to FIG. 6, which is a cross-sectional view of the assembled pliable handle 100 illustrating movement of gel during injection.

During assembly, the outer sheath 120 is placed over the core member 110 such that the proximal and distal threaded portions 111, 112 of the core member 110 project through the holes defined by the annular lips 123, 124, respectively of the outer sheath 120. Gel seals are formed by the proximal and distal shoulders 121, 122 of the outer sheath 120 coupling with the respective shoulders 113, 114 of the core member 110. The gel-containing portion 115 is thereby defined at its ends by the proximal and distal annular flanges 113, 114 of the core member 110, and at its longitudinal faces by the base of the core member 110 and the outer sheath 120.

After the outer sheath 120 is placed over the core member 110, gel 700 is injected through the gel injection bore 118 of the core member 110 using an injection nozzle 600. The gel 700 travels through the gel injection bore 118 until it is forced through the gel-directing through bore 116 in a direction perpendicular to its original traveling direction and then into the gel-containing portion 115 so that the gel 700 is uniformly disposed about the core member 110. When the gel-containing portion 115 is filled with gel 700, the injection nozzle 600 is removed and the proximal and distal end caps 130, 140 are secured to the proximal and distal threaded portions 111, 112 of the core member 110. That is, the proximal end cap 130 is secured to the proximal threaded portion of the 111 of the core member 110, and the distal end cap 140 is secured to the distal threaded portion 112 of the core member 110. Cap 140 seals the bore 118. Alternatively, a plug may be used to seal the bore 118. At this point the pliable handle 100 is completely assembled and ready to be secured to a device, such as the pole 150 of an umbrella, a handle of any one of a cane, walking stick, sports equipment (e.g., baseball bat, golf club, tennis racket, fishing rod, hockey stick, etc.), tool (e.g., screwdriver, hammer, etc.), garden equipment (e.g., shovel, rake, shears, etc.), kitchen tool (e.g., knife, pot, pan, can opener, etc.), cleaning equipment (e.g., broom, mop, etc.), writing instruments, beauty equipment (e.g., cosmetic applicators, curling irons, hair dryers, etc.), etc.

FIG. 7 is a cross-sectional view of the assembled pliable handle 100 illustrating movement of gel 700 while a force exerting pressure is applied to the handle 100. As a hand grips the pliable handle 100, force is applied in directions indicated by the arrows to cause the outer sheath 120 and gel 700 to deform. As indicated by the arrows, the gel 700 is forced in multiple directions. As mentioned above, the pliable handle has memory effect, such that after the force exerting pressure is removed, the deformation in the handle will remain for a period of time before the handle returns to its original shape.

The gel 700 may be formed of silicone or any other suitable material. The gel 700 may be colorless, or alternatively may be formed of any of a number of different colors, including a solid color or a multicolored (e.g., speckled) pattern. The gel 700 may also be transparent or alternatively, opaque.

Figure 8:
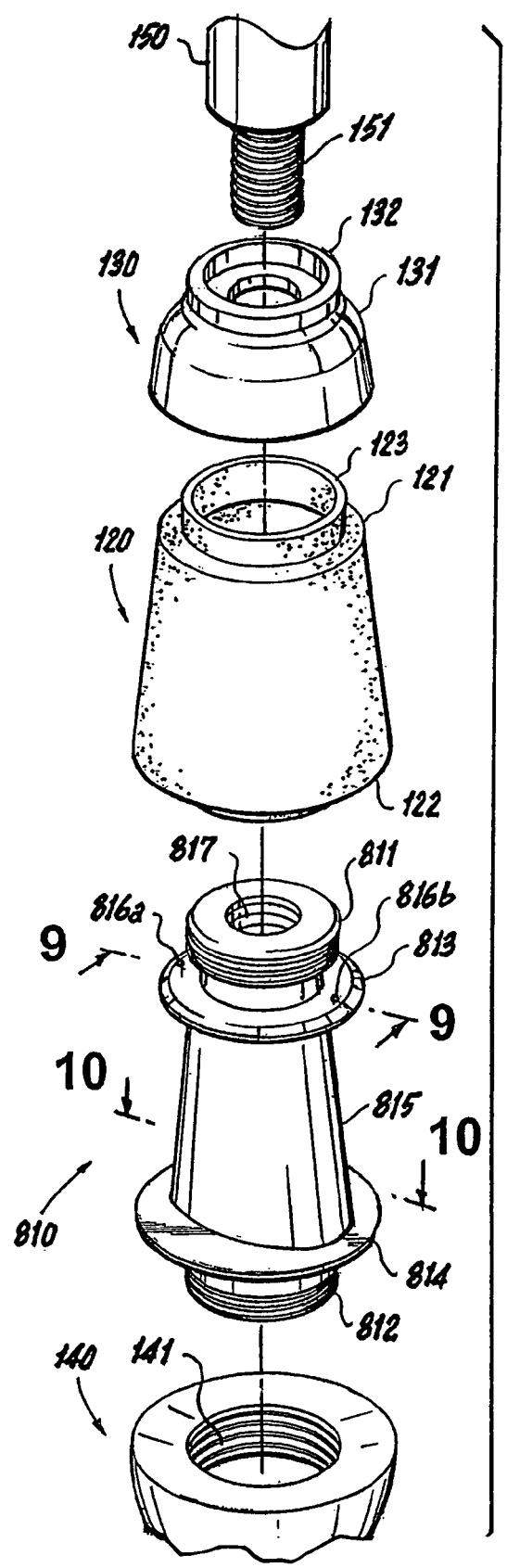
FIG. 8 is a front exploded perspective view of a second exemplary embodiment of the pliable handle having an alternate method for gel injection.

FIG. 8 is a front exploded perspective view of a second exemplary embodiment of the pliable handle according to the present invention having an alternate method for gel injection. Like the pliable handle 100 of the first exemplary embodiment shown in FIGS. 3–7, pliable handle 800 is configured to be securely yet removably attached to a pole 150 (which is not part of the present invention) and is generally formed of a core member 810, an outer sheath 120, a proximal end cap 130, and a distal end cap 140. Many of the components, such as the outer sheath 120, the proximal end cap 130, and the distal end cap 140 are the same in both of the pliable handles 100, 800 according to the first and second exemplary embodiments, respectively, and thus the same reference numerals have been used. A main difference in structure in the pliable handle according to this second exemplary embodiment is of the inner core 810.

This exemplary core member 810 is formed in a substantially oval shape (and alternatively may be cylindrical or any other suitable shape) with proximal and distal threaded portions 811, 812 formed on an outer surface of proximal and distal ends, respectively. Proximal and distal annular flanges 813, 814, which partially define a gel-containing portion 815 therebetween, are provided on the outer surface of the core member 810 at a location slightly inward along the longitudinal axis of the core member 810 from the respective proximal and distal threaded portions 811, 812. Gel injection through bores 816a, 816b are formed through the proximal annular flange 813 on opposing sides of the flange 813 and such that the longitudinal axes of the gel injection through bores 816a, 816b are substantially parallel to the longitudinal axis of the core member 810. A threaded bore 817 is formed in the proximal end of the core member 810 and is designed to threadingly mate with the pole 150 or other device to which the pliable handle of the present invention may be attached.

Figure 9:
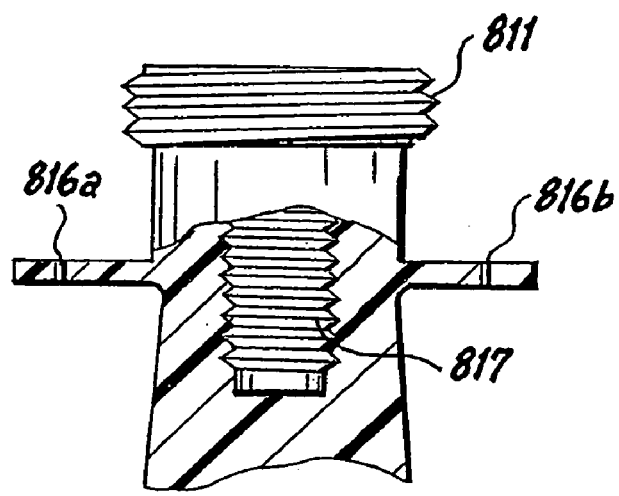
FIG. 9 is an elevation view of the core member in partial cutaway taken along line 9—9 of FIG. 8.
Figure 10:
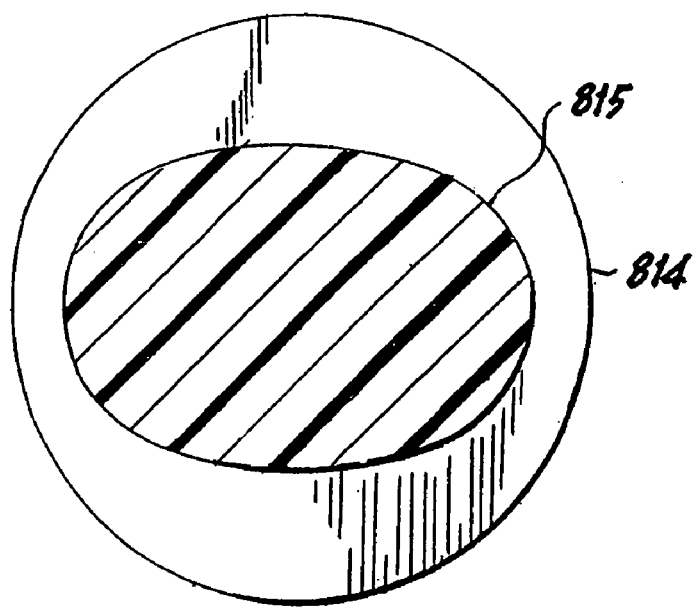
FIG. 10 is a sectional plan view of the core member taken along line 10—10 of FIG. 8.

FIG. 9 is an elevation view of the core member in partial cutaway taken along line 9—9 of FIG. 8, and FIG. 10 is a sectional plan view of the core member taken along line 10—10 of FIG. 8. The core member 810 has formed therein the gel injection through bores 816a, 816b and threaded bore 817 as described in the previous paragraph. As will be described in detail further below, the gel injection though bores 816a, 816b are designed to receive gel and exhaust air, respectively, during the handle assembly process. It is appreciated by those skilled in the art that the number, positions and sizes of the gel injection through bores 816a, 816b can be modified provided that the modification results in bores that are suitable for the intended purpose. The core member 810 can be formed of PVC, ABS, PE or PP plastic, or any other suitable material.

Figure 11:
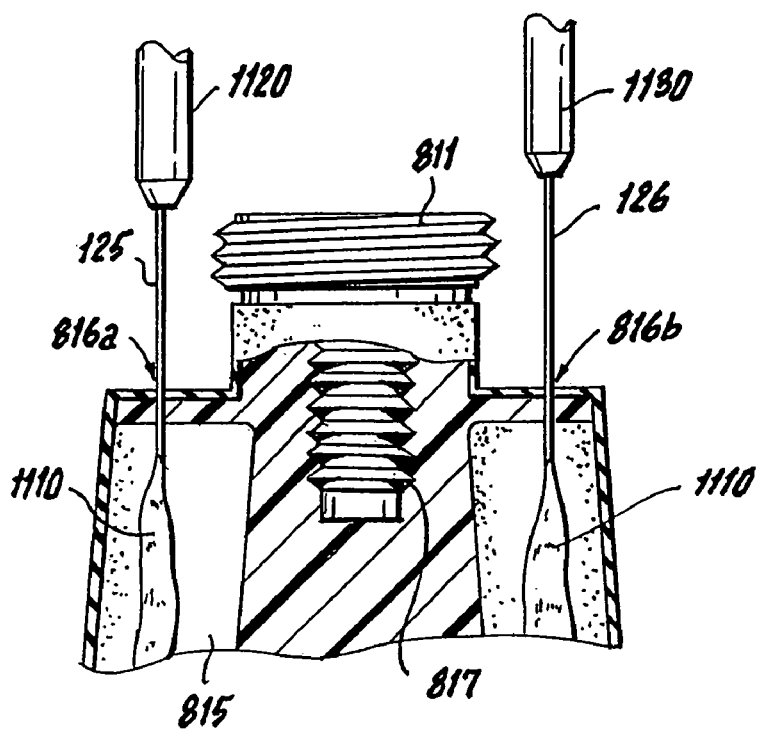
FIG. 11 is an elevation view in partial cutaway of the assembled pliable handle of FIG. 8 having two gel injection bores and illustrating movement of gel during injection.

An exemplary method for assembling the pliable handle 800 will now be described with reference to FIG. 11, which is an elevation view in partial cutaway of the assembled pliable handle 800 of FIG. 8 illustrating movement of gel 1100 during injection.

During assembly, the outer sheath 120 is placed over the core member 810 such that the proximal and distal threaded portions 811, 812 of the core member 810 project through the holes defined by the annular lips 123, 124, respectively of the outer sheath 120. Gel seals are formed by the proximal and distal shoulders 121, 122 of the outer sheath 120 coupling with the respective shoulders 813, 814 of the core member 810. The gel-containing portion 815 is thereby defined at its ends by the proximal and distal annular flanges 813, 814 of the core member 810, and at its longitudinal faces by the base of the core member 810 and the outer sheath 120.

Figure 12:
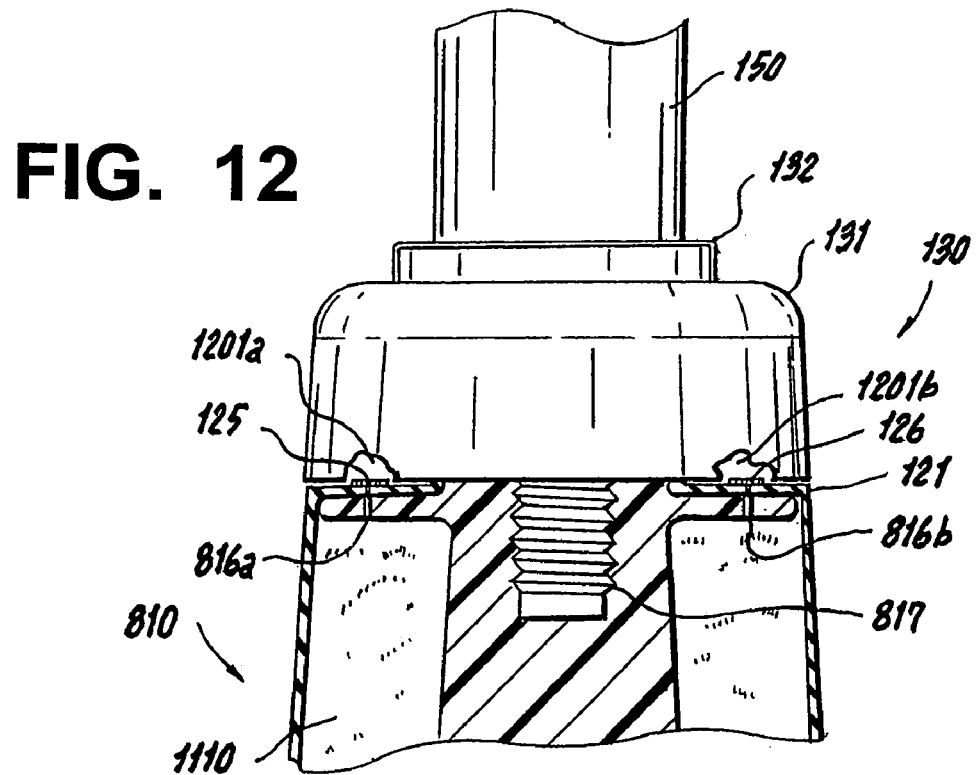
FIG. 12 is an elevation view in partial cutaway of the assembled, gel-filled pliable handle of FIG. 8.

After the outer sheath 120 is placed over the core member 810, holes 125, 126 are pierced through the outer sheath 120 to correspond with gel injection through bores 816a, 816b, respectively. As shown in FIG. 11, gel 1110 is injected through both of gel injection through bores 816a and 816b of the core member 810 using injection needles 1120 and 1130, respectively. Gel 1110 travels through the gel injection through bores 816a, 816b and fills the gel-containing portion 815 so that the gel 1110 is uniformly disposed about the core member 810. When the gel-containing portion 815 is filled with gel 1110, the injection needles 1120, 1130 are removed and the proximal and distal end caps 130, 140 are secured to the proximal and distal threaded portions 811, 812 of the core member 810. That is, the proximal end cap 130 is secured to the proximal threaded portion of the 811 of the core member 810, and the distal end cap 140 is secured to the distal threaded portion 812 of the core member 110. Cap 130 seals the gel injection bores 816a, 816b. Also, plugs 1201a, 1201b may be used to plug the gel injection through bores 816a and 816b before the cap 130 is secured so as to minimize the risk of any gel leaks; the plugs 1201a, 1201b may be made of any material or shape (e.g., screws set with epoxy glue) suitable for the intended purpose. At this point the pliable handle 800 is completely assembled and ready to be secured to a device, as shown in FIG. 12.

FIG. 13 is a perspective view of a third exemplary embodiment of the pliable handle according to the present invention. In this embodiment, the outer sheath 120 is modified to form ribs 1310 thereon. The ribs 1310 are sized and spaced such that fingers may be placed comfortably within the spaces between the ribs 1310. Aside from better comfort, the ribs 1310 provide a more secure grip to thereby prevent loss of the handle 1300 along with the device to which it is attached. Alternatively, the ribs 1310 may be spaced closer together, that is, closer that the width of the fingers, so as to merely provide better friction for gripping. Preferably, the ribs 1310 are made of the same material as the outer sheath 120, but the ribs 1310 may be made of any other suitable material.

Further, a loop (or wrist strap) 1320 may be provided on the closed end of the distal end cap 140. Alternatively, the loop 1320 may be secured to the proximal end cap 130, between the pole 150 and the proximal end cap 130, or any other position suitable for its intended purpose. This loop 1320 may be used for hanging the handle along with the device to which it is attached, or for securing the handle and corresponding device to a wrist. The loop 1320 may be made of plastic or any other suitable material.

FIG. 14 is a perspective view of a fourth exemplary embodiment of the pliable handle of the present invention. The pliable handle 1400 of this embodiment is elongated for two-handed gripping.

Figure 15:
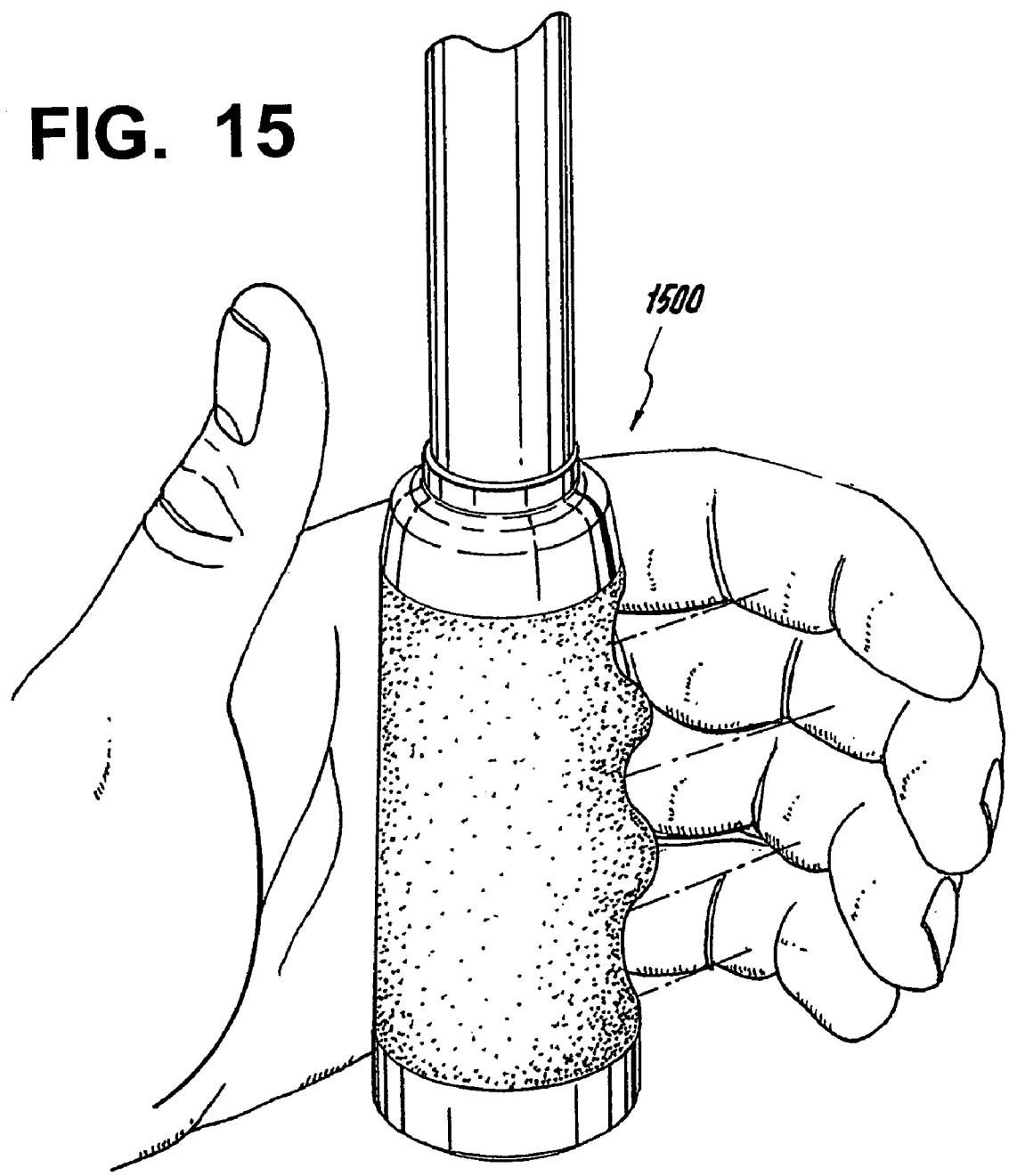
FIG. 15 is a perspective view of a fifth exemplary embodiment of the pliable handle having a contoured shape.

FIG. 15 is a perspective view of a fifth exemplary embodiment of the pliable handle of the present invention. The sheath of the pliable handle 1500 of this embodiment has a shape contoured to fit a hand. The inner core may have substantially the same shape as one of the shapes of the inner cores described above or any other modified shape that would be suitable for the intended purpose. Pliable handle 1700 may also include a loop like the one shown in FIG. 13.

Figure 16:
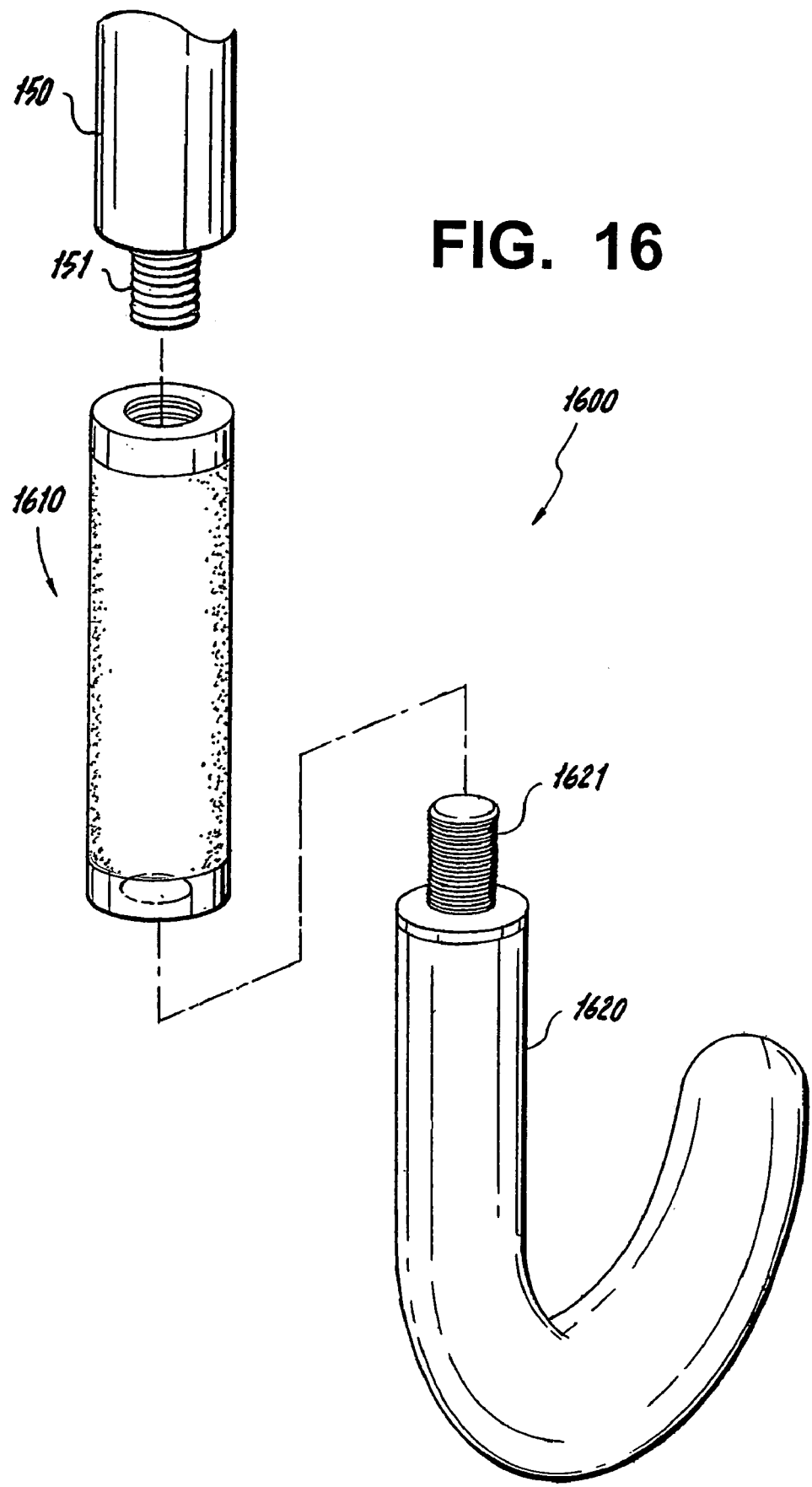
FIG. 16 is an exploded perspective view of a sixth exemplary embodiment of the pliable handle applied to an umbrella with a curved handle portion.

FIG. 16 is an exploded perspective view of a sixth exemplary embodiment of the pliable handle of the present invention. The pliable handle 1600 has a pliable gripping portion 1610 similar in construction to the other handles described throughout this description, and thus descriptions of its features will not be repeated here. A main difference in pliable handle 1600 is that at the distal end, rather than being attached to a distal end cap, as described above, it is attached to a curved handle portion 1620. That is, a threaded end 1621 of the curved handle portion 1620 is threadingly mated with a threaded bore (not shown) formed in the distal end portion of the pliable gripping portion 1610.

Figure 17:
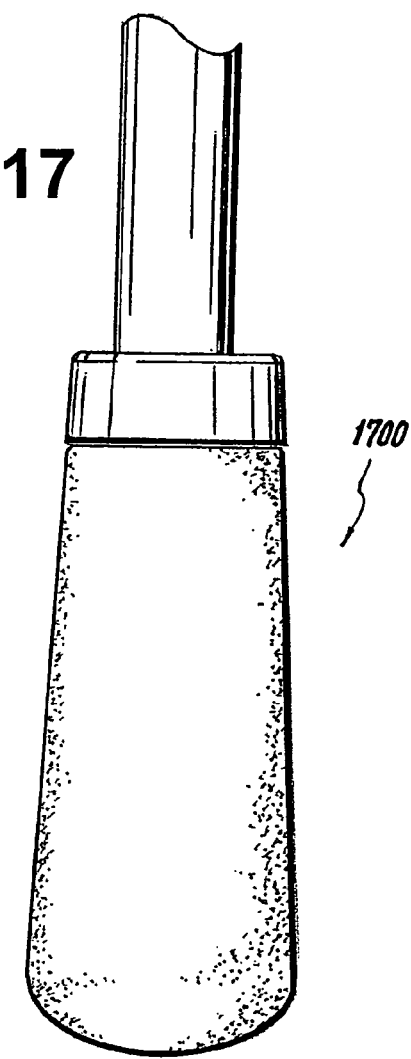
FIG. 17 is a perspective view of a seventh exemplary embodiment of the pliable handle having no distal end cap.

FIG. 17 is a perspective view of a seventh exemplary embodiment of the pliable handle of the present invention. The pliable handle 1700 is similar in construction to the other handles described throughout this description. However, pliable handle 1700 does not have end caps, the inner core has a dome-shaped portion, and the outer sheath has a closed end. A more detailed explanation follows.

Figure 18:
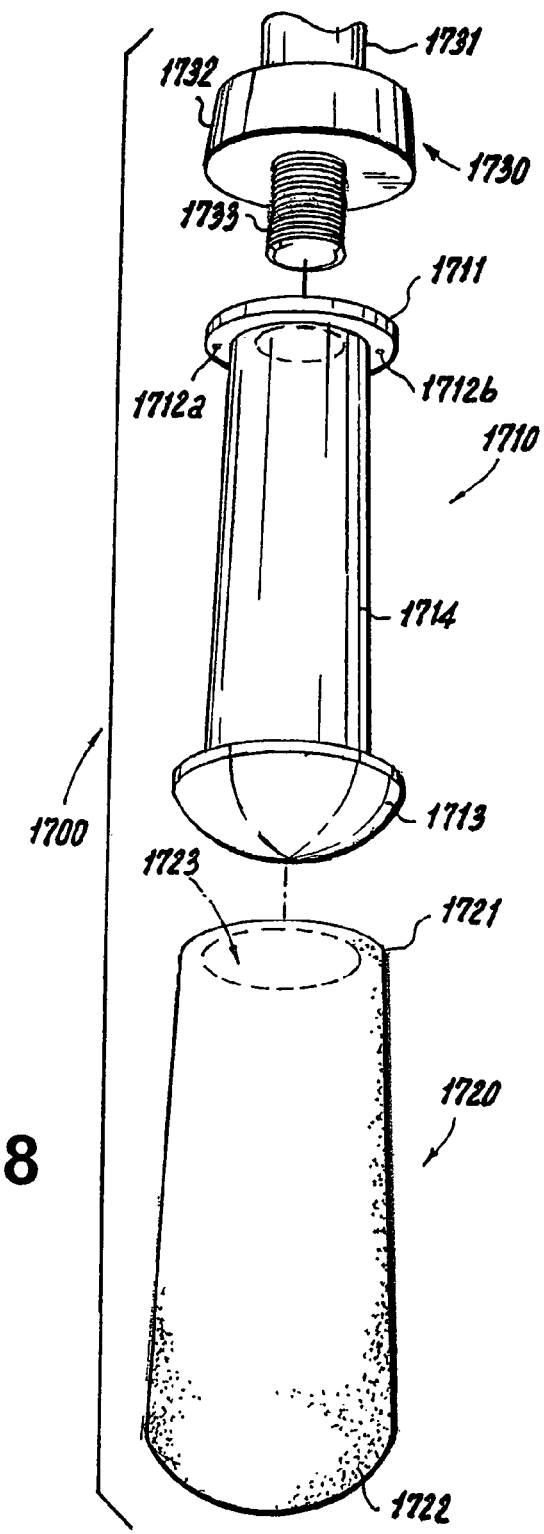
FIG. 18 is an exploded perspective view of the pliable handle of FIG. 17.

FIG. 18 is an exploded perspective view of the pliable handle of FIG. 17. The pliable handle 1700 is configured to be securely yet removably attached to a pole portion 1730 and is generally formed of a core member 1710 and an outer sheath 1720.

One exemplary core member 1710 is formed in a substantially cylindrical shape (but can be any other suitable shape) with a distal dome-shaped portion 1713. An annular flange 1711, which with the dome-shaped portion 1713 partially defines a gel-containing portion 1714 therebetween, is provided on the outer surface of the core member 1710 at the proximal end of the core member 1710. Gel injection through bores 1712a, 1712b, which are similar to gel injection through bores 816a and 816b shown in FIG. 8, are formed through the annular flange 1711 on opposing sides of the flange 1711 and such that the longitudinal axes of the gel injection through bores 1712a, 1712b are substantially parallel to the longitudinal axis of the core member 1710. A threaded bore (not shown) is formed in the proximal end of the core member 1710 and is designed to threadingly mate with the pole portion 1730 or other device to which the pliable handle of the present invention may be attached.

The outer sheath 1720 is provided over the core member 1710 such that the sheath is uniformly disposed about the core member 1710. Together the outer sheath 1720 and the core member 1710 define the gel-containing portion 1714 therebetween. That is, the gel-containing portion 1714 is defined at its ends by the annular flange 1711 and the dome-shaped portion 1713 of the core member 1710, and at its longitudinal faces by the base of the core member 1710 and the outer sheath 1720.

The outer sheath 1720 is substantially cylindrical in shape and has a proximal open end 1721 having a shoulder defining a hole 1723 and a distal closed end 1722. The diameter of the shoulder of the proximal open end 1721 corresponds with the diameter of the annular flange 1711 of the core member 1710, such that when the pliable handle 1700 is assembled, the shoulder at the proximal open end 1721 forms a gel seal with the annular flange 1711 due to the intimate fit between these members.

After assembly, the pliable handle 1700 can be secured to a device, such as pole portion 1730 having a threaded end 1733 and an annular flange 1732 provided on the outer surface of the pole 1731 of the pole portion 1730 at a location adjacent to the threaded end 1733. The diameter of the annular flange 1732 is preferably, but not necessarily, the same as the diameter of the annular flange 1711 of the core member 1710. The threaded end 1733 is screwed into the threaded bore (not shown) formed in the proximal end of the core member 1710.

Figure 19:
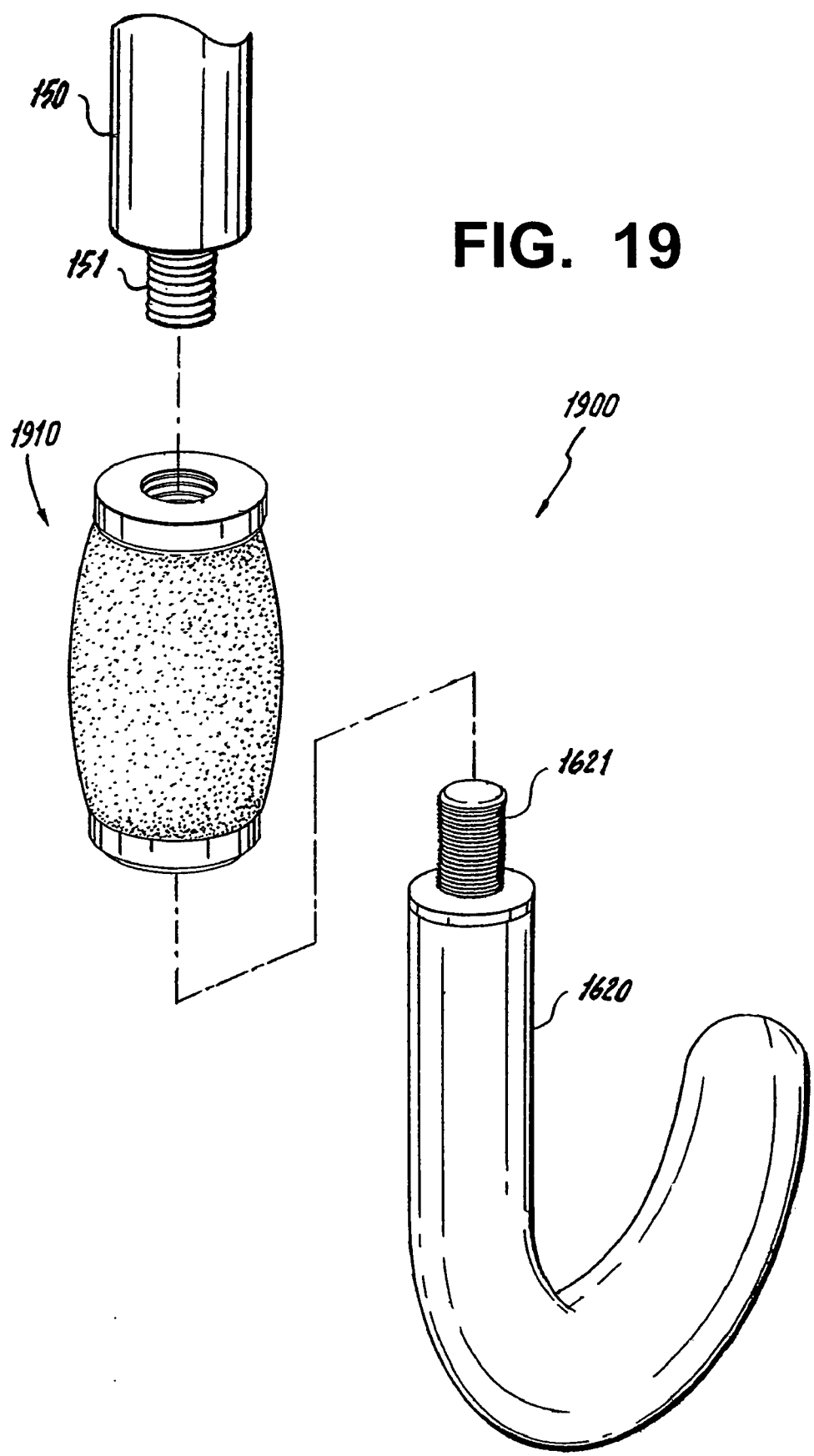
FIG. 19 is an exploded perspective view of an eighth exemplary embodiment of the pliable handle having an alternative core member.

FIG. 19 is an exploded perspective view of an eighth exemplary embodiment of the pliable handle having an alternative core member. The pliable handle 1900 has a pliable gripping portion 1910. A main difference in the pliable gripping portion 1910 of the pliable handle 1900 is that the core member (described in detail below) is of three-part construction. Similar to the pliable gripping portion 1610 of FIG. 16, this pliable gripping portion 1910 is shown attached to a pole 150 at the proximal end and to a curved handle portion 1620 at the distal end. It is understood, however, that the pliable gripping portion 1910 need not be applied to a pole 150 or a curved handle portion 1620, but may alternatively be applied to any other device suitable for the intended purpose.

Figure 20:
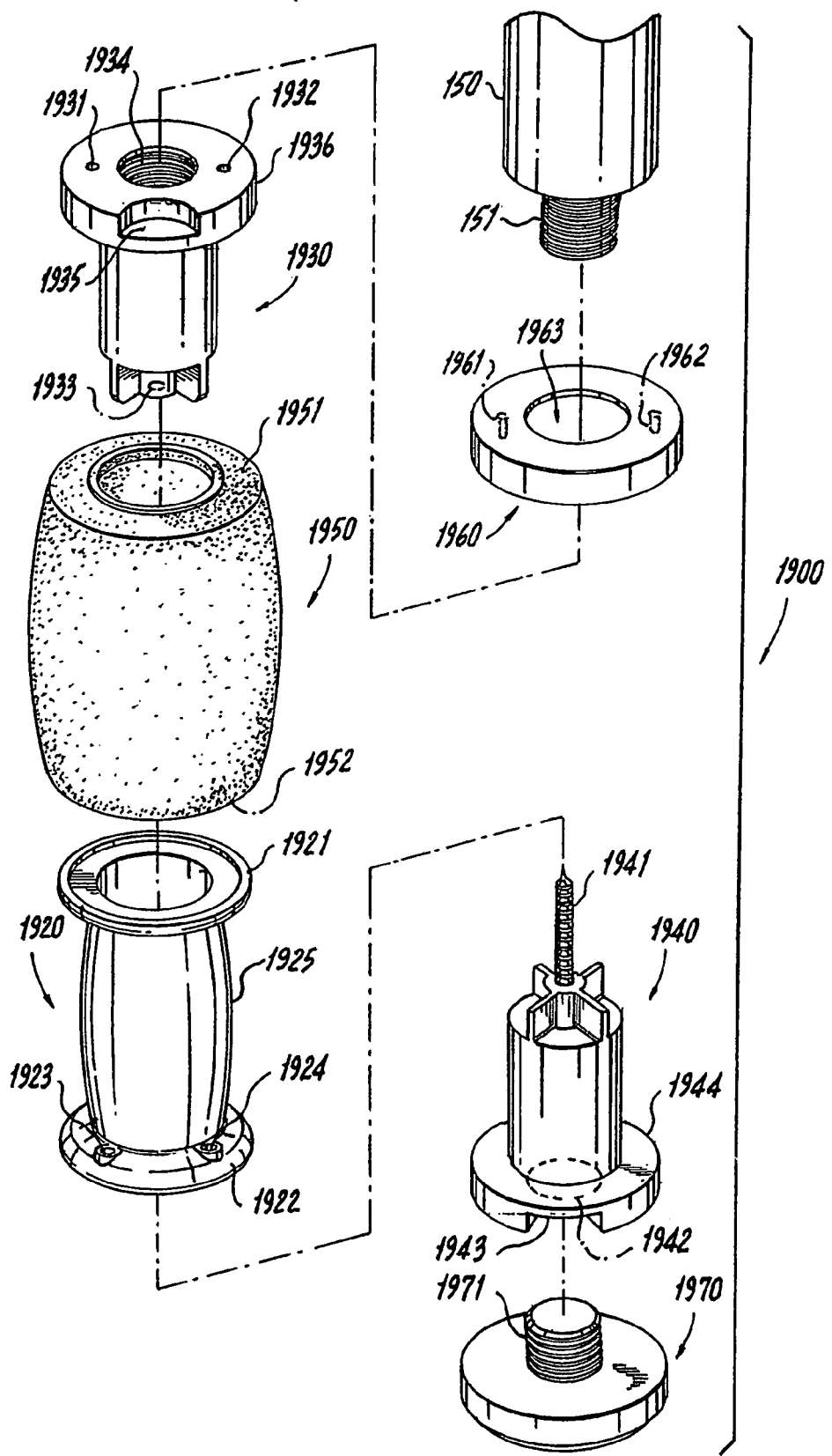
FIG. 20 is a front exploded perspective view of the pliable handle of FIG. 19.

FIG. 20 is a front exploded perspective view of the pliable handle of FIG. 19 having the alternative core member consisting of three parts. The exemplary three-part core member is formed of a main core member part 1920, a proximal sealer 1930, and a distal sealer 1940. The core member main part 1920 is substantially tubular in shape with an annular flange 1921 at the proximal end and an annular flange 1922 at the distal end. The proximal and distal annular flanges 1921, 1922 partially define a gel-containing portion 1925 therebetween. The distal flange 1922 has formed therein four gel injection bores, only two of which (1923 and 1924) are shown, such that the longitudinal axes of the gel injection bores 1923, 1924 are substantially parallel to the longitudinal axis of the core member main part 1920 and are spaced apart from one another. It is understood that although four gel injection bores are shown, there may be any number of gel injection bores suitable for the intended purpose. Also, these gel injection bores may alternatively be formed in the proximal annular flange 1921.

The distal sealer 1940 is substantially cylindrical in shape with an annular flange 1944 at one end. Formed in the annular flange 1944 is a threaded bore 1942, though this bore 1942 is not essential to the invention. Formed in the opposite end along the central axis of the distal sealer 1940 is a screw 1941 that projects from the distal sealer 1940. The distal sealer 1940 is shown having in the annular flange 1944 a semicircular notch 1943, which is intended to allow for a handle strap. However, this notch 1943 is not required, and a strap could be secured in the center of the annular flange 1944 rather than the side.

The proximal sealer 1930 is also substantially cylindrical in shape with an annular flange 1936 having a threaded bore 1934 and a semicircular notch 1935 formed in one end. Formed in the opposite end is a hole 1933, which is designed to mate with the screw 1941 of the distal sealer 1940.

The proximal sealer 1930 and distal sealer 1940 are designed to be inserted at opposite ends of the core member main part 1920 and screwingly mated together within the core member main part 1920. More specifically, after the proximal and distal sealers 1930, 1940 are inserted into the tubular portion of the core member main part 1920 at opposing ends, a screw portion 1941 of the distal sealer 1940 is inserted into a hole portion 1933 of the proximal sealer 1930 and screwed therein such that the three parts of the core member are coupled together to form a single unit. Of course the screw portion 1941 may be alternatively formed on the proximal sealer 1930 and the hole portion 1933 correspondingly formed in the distal sealer 1940. The sealing affects of the proximal sealer 1930 and distal sealer 1940 will become clear from the description of the assembly process below.

The pliable handle 1900 also includes an outer sheath 1950 that is substantially cylindrical in shape and has at its ends a proximal shoulder 1951 and a distal shoulder 1952, respectively. The diameter of each of the proximal and distal shoulders 1951, 1952 corresponds with the diameter of the respective proximal and distal annular flanges 1921, 1922 of the core member main part 1920.

The pliable handle 1900 may also include a proximal end cap 1960 and a distal end cap 1970. The proximal end cap 1960 has an annular lip 1963, which has a diameter that is smaller than that of the proximal end cap 1960 itself, defines a hole, and is located concentric with the proximal end cap 1960. The diameter of the distal end of the proximal end cap 1960 is substantially similar to the diameter of the proximal shoulder 1951 of the outer sheath 1950. Formed on the distal end or underside of the proximal end cap 1960 may be projections 1961, 1962 designed to secure the proximal end cap 1960 to the proximal end of the proximal sealer 1930 having corresponding bores 1931, 1932 formed therein. It is to be understood, however, that the proximal end cap 1960 is not required.

The distal end cap 1970 has formed in its proximal side along its central axis a threaded projection 1971, which is designed to threadingly mate with the threaded bore 1942 of the distal sealer 1940. It is to be understood, however, that the distal end cap 1970 is not required.

Figure 21:
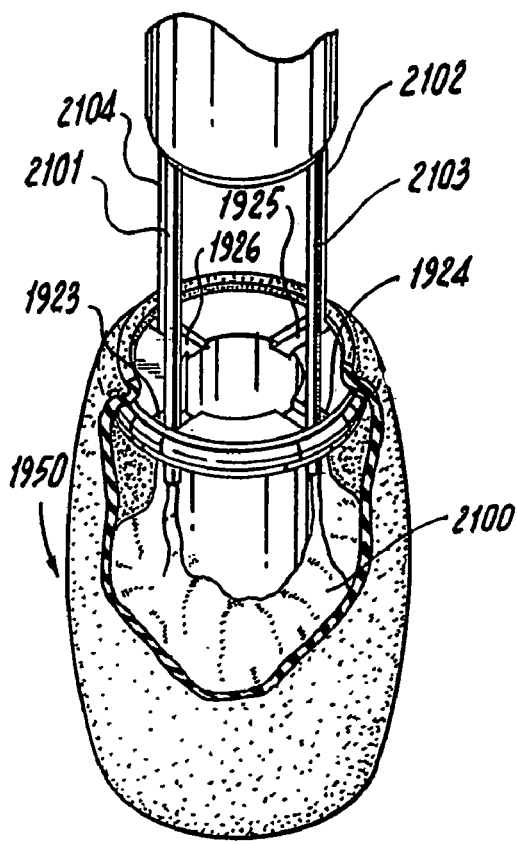
FIG. 21 is a perspective view showing the pliable handle of FIG. 19 in partial cutaway having four gel injection bores and illustrating movement of gel during injection
Figure 22:
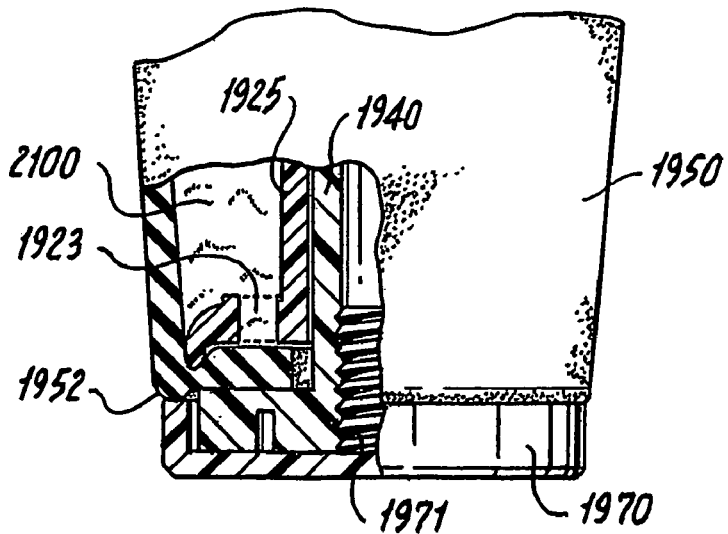
FIG. 22 is a sectional view of the pliable handle of FIG. 19 in partial cutaway illustrating compression on an outer sheath to seal gel injection bores.

The assembly process of the eighth exemplary embodiment will now be described with reference to FIGS. 21 and 22. FIG. 21 is a perspective view showing the pliable handle 1900 in partial cutaway and having four gel injection bores 1923, 1924, 1925, 1926 and illustrating movement of gel 2100 during injection. FIG. 22 is a sectional view of the pliable handle 1900 in partial cutaway illustrating compression of the shoulder 1952 of the outer sheath 1950 to seal the gel injection bores 1923, 1924, 1925, 1926.

During assembly, the outer sheath 1950 is placed over the core member main part 1920 such that the proximal and distal shoulders 1951, 1952 of the outer sheath 1950 grip the respective annular flanges 1921, 1922 of the core member main part 1920. A gel-containing portion 1925 is thereby defined at its ends by the proximal and distal annular flanges 1921, 1922 of the core member main part 1920, and at its longitudinal faces by the base of the core member main body 1920 and the outer sheath 1950.

Referring specifically to FIG. 21, after the outer sheath 1950 is placed over the core member main part 1920, gel 2100 is injected through the four gel injection bores 1923, 1924, 1925, 1926 of the core member main part 1920 using injection nozzles 2101, 2102, 2103, 2104, respectively. The gel 2100 travels through the gel injection bores 1923, 1924, 1925, 1926 to fill the gel-containing portion 1925, and then the injection nozzles 2101, 2102, 2103, 2104 are removed. Again, the specific number of four gel injection bores and four injection nozzles are not required. The number may be any that is suitable for the intended purpose.

Now referring to FIG. 22, the proximal sealer 1930 and distal sealer 1940 are subsequently inserted at opposite ends of the core member main part 1920 and screwingly mated together such that the screw portion 1941 of the distal sealer 1940 is screwed within the hole portion 1931 of the proximal sealer 1930. As the proximal sealer 1930 and distal sealer 1940 are screwed tighter together, the distal shoulder portion 1952 of the outer sheath 1950 is compressed between the distal annular flange 1922 of the core member main part 1920 and the distal sealer 1940, thereby sealing the gel injection bores 1923, 1924, 1925, 1926 formed in the distal annular flange 1922 and securely containing the gel 2100 within the gel-containing portion 1925. Finally, the end caps 1960, 1970 may be secured to the proximal end of the proximal sealer 1930 and the distal end of the distal sealer 1940, respectively.

FIG. 23 is a rear exploded perspective view of a ninth exemplary embodiment of the pliable handle. The pliable handle 2300 is generally formed of a core member 2310, which has a core member main portion 2310a, a core member proximal sealing portion 2310b, and a core member distal sealing portion 2310c, an outer sheath 2320, a proximal end cap 2330, and a distal end cap 2340. Main differences in the pliable handle according to this ninth exemplary embodiment as compared with other exemplary embodiments are in the structure of the core member portion 2310.

Figure 24B:
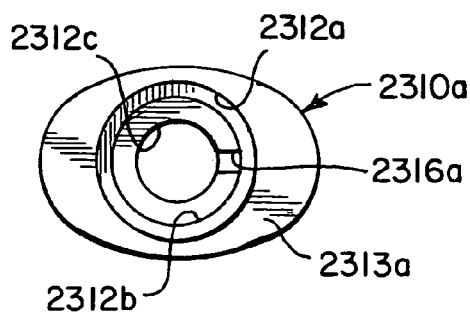
FIG. 24*b* is a top plan view of the core member main portion of the pliable handle of FIG. 23.
Figure 24C:
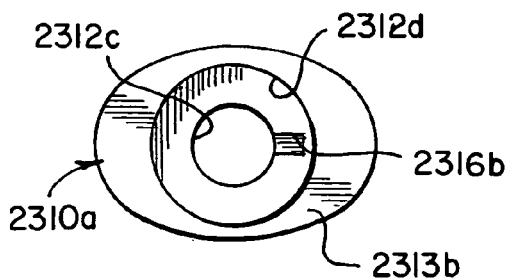
FIG. 24*c* is a bottom plan view of the core member main portion of the pliable handle of FIG. 23.

FIGS. 24a, 24b, and 24c show different views of the core member main portion 2310a; FIG. 24a shows a front elevation view of the core member main portion 2310a, FIG. 24b shows a top plan view, and FIG. 24c shows a bottom plan view. The core member main portion 2310a is hollow and formed in a substantially bowed shape (and alternatively may be cylindrical, oval or any other suitable shape). Proximal and distal annular flanges 2313a, 2313b, which partially define a gel-containing portion 2315 therebetween, gradually flare out from the outer surface of the core member main portion 2310a toward respective longitudinal ends of the main portion 2310a. The dimensions of the outer profiles of the proximal and distal annular flanges 2313a, 2313b can be the same or different from one another, depending on the desired shape of the pliable handle 2300.

FIG. 24b shows a top plan view of the core member main portion 2310a. The bore 2312 in the proximal end decreases in diameter in a step-wise fashion. A first bore portion 2312a is round, is concentric with the longitudinal axis of the core member main portion 2310a, and has a diameter that is smaller than the diameter of the oval outer profile of the proximal end of the core member main portion 2310a. A second bore portion 2312b is concentric with the longitudinal axis of the core member main portion 2310a and with the first bore portion 2312a, and has a diameter that is smaller than the diameter of the first bore portion 2312a. This second bore portion 2312b has at least one slot 2316a, the function of which is described further below, formed in the interior such that the longitudinal axis of the slot 2316a is substantially parallel to the longitudinal axis of the core member main portion 2310a. A third bore portion 2312c is concentric with each of the longitudinal axes of the core member main portion 2310a, the first bore portion 2312a, and the second bore portion 2312b, and has a diameter that is smaller than the diameter of the second bore portion 2312b. This third bore portion 2312c is provided through to almost the distal end of the core member main portion 2310a.

FIG. 24c shows a bottom plan view of the core member main portion 2310a. The bore in the distal end decreases in diameter in a step-wise fashion similar to the proximal end, except that this distal end has one less step than the proximal end. A fourth bore portion 2312d is concentric with the longitudinal axis of the core member main portion 2310a, has a diameter that is smaller than the diameter of the outer oval profile of the distal end of the core member main portion 2310a, and has approximately the same as the diameter as the first bore portion 2312a. The fourth bore portion 2312d has at least one slot 2316b, the function of which is described further below, formed in the interior such that the longitudinal axis of the slot 2316b is substantially parallel with the longitudinal axis of the core member main portion 2310a. The fourth bore portion 2312d then steps down to the third bore portion 2312c described above with respect to the proximal end of the core member main portion 2310a.

Figure 25A:
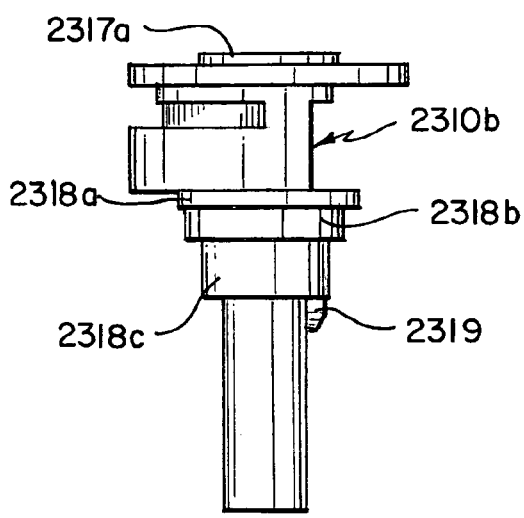
FIG. 25*a* is a left side elevation of the core member proximal sealing portion of the pliable handle of FIG. 23.
Figure 25B:
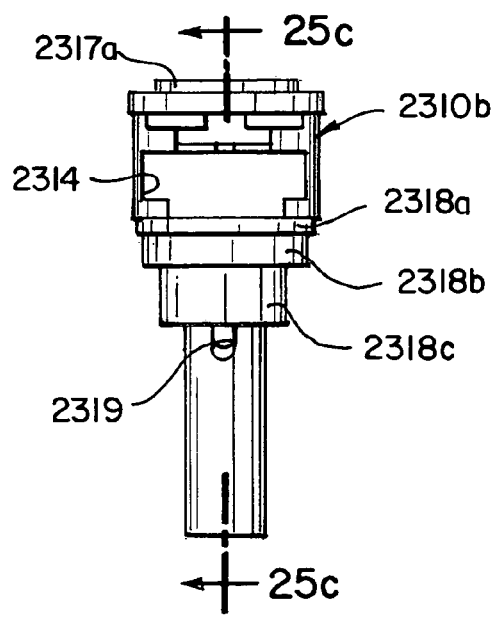
FIG. 25*b* is a front elevation of the core member proximal sealing portion of the pliable handle of FIG. 23.
Figure 25C:
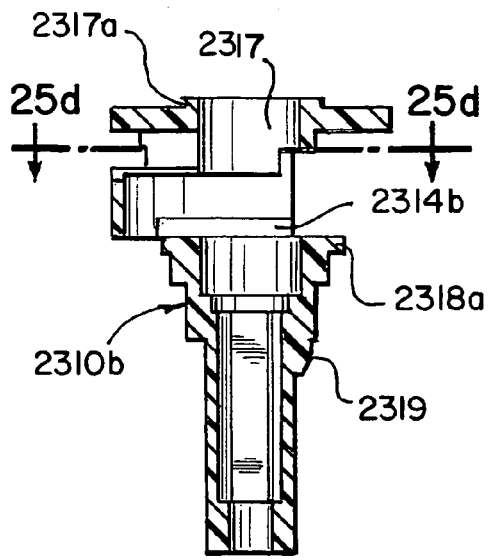
FIG. 25*c* is a cross-sectional view taken substantially along line 25*c*—25*c* of FIG. 25*b*.
Figure 25D:
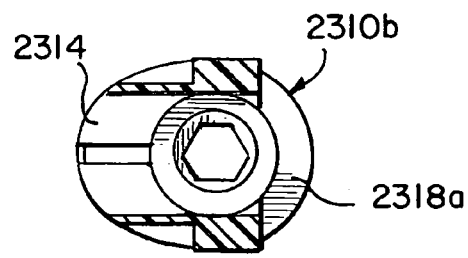
FIG. 25*d* is a cross-sectional view taken substantially along line 25*d*—25*d* of FIG. 25*c*.

FIGS. 25a, 25b, and 25c show different views of the core member proximal sealing portion 2310b, which is hollow and has three main sections; FIG. 25a shows a left side elevation, FIG. 25b shows a front elevation, FIG. 25c shows a cross-sectional view taken substantially along line 25c—25c of FIG. 25b, and FIG. 25d shows a cross-sectional view taken substantially along line 25d—25d of FIG. 25c. The first, most proximal section has an oval cross-section, the second, middle section has a round, stepped cross-section, and the third, most distal section has a round cross-section with a diameter that is smaller than that of the second section. Of course the specific shape of the sealing portion 2310b can vary as long as it is suitable for the intended purpose.

The first, most proximal oval section has a bore 2317 which is concentric with the longitudinal axis of the core member proximal sealing portion 2310b and is defined at its outer edge by a lip 2317a. An access hole 2314 is formed in a side of the first, most proximal section, perpendicular to the longitudinal axis of the proximal sealing portion 2310b, and functions to permit access to a release button 2333 (shown in FIG. 29) for opening the canopy of the umbrella.

The second, middle round section has three annular outer steps 2318a, 2318b, 2318c which are each concentric with the longitudinal axis of the core member proximal sealing portion 2310*b* and gradual decrease in outer diameter towards the distal end of the sealing portion 2310*b*. Also, within this second section the bore 2317 decreases in diameter in a step-wise fashion towards the distal end of the sealing portion 2310*b*.

The third, most distal round section has an outer diameter that is smaller than that of the second section. Also, the diameter of the bore 2317 in the third section remains substantially the same as in the second section, but instead has a hexagonal cross-section, except for the most distal portion of the bore 2317, which changes back to a round cross-section with an even smaller diameter. A notch 2319 is formed on the outer circumference of the third section substantially parallel with the longitudinal axis of the sealing portion 2310*b* starting from the second section and projecting toward the distal end of the proximal sealing portion 2310*c*. Although one notch 2319 is shown, any number of notches suitable for the intended purpose would suffice.

FIG. 26*a* shows a front elevation view of the core member distal sealing portion 2310*c*, and FIG. 26*b* shows a top plan view of the core member distal sealing portion 2310*c*, which is hollow and has two main sections. Of course the specific shape of the sealing portion 2310*c* can vary as long as it is suitable for the intended purpose. The first, most distal section has a round cross-section, and the second, most proximal section also has a round cross-section, but with a smaller diameter than that of the first section. The first, most distal round section has a bore portion 2312*e*, which is concentric with the longitudinal axis of the sealing portion 2310*c*, and has two opposing flat portions 2312*g* on the outer diameter. The second, most proximal section has bore portions 2312*f*, 2312*h* and a notch 2311. The bore portions 2312*f* and 2312*h* are each concentric with the longitudinal axis of the sealing portion 2310*c*. The bore portion 2312*f* has a diameter that is smaller than that of the bore portion 2312*e* located in the first section, and the bore portion 2312*h* at the most proximal end of the sealing portion 2310*c* has a diameter that is smaller than that of the bore portion 2312*f*. The notch 2311 is formed on the outer circumference of the second section parallel with the longitudinal axis of the sealing portion 2310*c* starting from the first section and projecting toward the proximal end of the sealing portion 2310*c*. Although one notch 2311 and two flat portions 2312*g* are shown, any number of notches and/or flat portions suitable for the intended purpose would suffice.

The outer sheath 2320, which is shown in FIG. 23, is substantially oval in shape and has at its ends a proximal shoulder 2321 and a distal shoulder 2322, respectively, which may or may not be flanged. The proximal and distal shoulders 2321, 2322 each define a hole provided at the proximal and distal ends, respectively, of the outer sheath 2320. The diameter and shape of each of the proximal and distal shoulders 2321, 2322 corresponds with the diameter and shape of the respective proximal and distal annular flanges 2313*a*, 2313*b* of the core member main portion 2310*a*, such that when the pliable handle 2300 is assembled, the proximal and distal shoulders 2321, 2322 form gel seals with the proximal and distal annular flanges 2313*a*, 2313*b*, respectively, due to the intimate fit between these members. The outer sheath 2320 is provided over the core member main portion 2310*a* such that the sheath is substantially uniformly disposed about the core member main portion 2310*a*. Together the outer sheath 2320 and the core member main portion 2310*a* define a gel-containing portion 2315 therebetween. That is, the gel-containing portion 2315 is defined at its ends by the proximal and distal annular flanges 2313*a*, 2313*b* of the core member main portion 2310*a*, and at its longitudinal faces by the base of the core member main portion 2310*a* and the outer sheath 2320.

FIG. 27 shows perspective view of the distal end cap 2340. The distal end cap 2340 is oval in cross-section and has an outer profile that is substantially similar to the outer profile of the distal shoulder 2322 of the outer sheath 2320. The distal end cap 2340 has an open end and a closed end. Formed in the open end is an annular lip 2343 having two notches 2341 projecting inwardly therefrom and being designed to secure the distal cap 2340 to the two flat portions 2312*g* of the core member distal sealing portion 2310*c*. Of course, any number of notches or other securing means suitable for the intended purpose would suffice. The closed end of the cap 2340 is substantially flat and may have a loop (or wrist strap) 2342 secured thereto. The loop 2342 may be made of elastic or any other suitable material.

FIG. 28*a* shows a perspective view of the proximal end cap 2330, FIG. 28*b* shows a bottom plan view, and FIG. 28*c* shows a cross-sectional view taken substantially along line 28*c*—28*c* of FIG. 28*a*. The proximal end cap 2330 is oval in cross-section and cup-like in shape with two open ends. The proximal open end of the cap 2330 has a shoulder 2331, which defines a round hole 2331*a*. The hole 2331*a* is concentric with the longitudinal axis of the proximal end cap 2330 and permits the insertion of a pole to which the pliable handle 2300 may be attached. The outer profile of the distal end of the proximal end cap 2330 is substantially the same as the outer profile of its proximal end, and is substantially similar in profile to the outer profile of the proximal shoulder 2321 of the outer sheath 2320. Of course, the profiles of the distal and proximal ends may be different from one another, depending on the design of the handle. Formed in a side of the proximal end cap 2330 is a hole 2332 designed to permit access to the release button 2333, which when pressed may be used to automatically open a canopy of an umbrella, as is known in the art. The release button 2333 does not form a part of the present invention, and thus for the sake of brevity, its details are omitted here.

One exemplary method for assembling the pliable handle 2300 of FIG. 23 will now be described. During assembly, the outer sheath 2320 is placed over the core member main portion 2310*a* such that gel seals are formed by the proximal and distal shoulders 2321, 2322 of the outer sheath 2320 coupling with the respective shoulders 2313*a*, 2313*b* of the core member main portion 2310*a*. The gel-containing portion 2315 is thereby defined at its ends by the proximal and distal annular flanges 2313*a*, 2313*b* of the core member main portion 2310*a*, and at its longitudinal faces by the base of the core member main portion 2310*a* and the outer sheath 2320.

After the outer sheath 2320 is placed over the core member 2310*a*, one end of the outer sheath 2320 is pulled back and gel is injected into the gel-containing portion 2315 using an injection nozzle. When the gel-containing portion 2315 is filled with gel 700, the injection nozzle is removed. Of course, other gel insertion means and methods, as described with respect to the previous embodiments, may alternatively be used.

The core member proximal sealing portion 2310*b* and core member distal sealing portion 2310*c* are then secured to the core member main portion 2310*a*. More specifically, after the release button 2333 is inserted into the hole 2314 of the core member proximal sealing portion 2310*b*, the sealing portion 2310*b* is inserted distal end first into the core member main portion 2310*a* by mating the rib 2319 of the core member proximal sealing portion 2310*b* with the slot 2316a of the core member main portion 2310a. Also, the core member distal sealing portion 2310c is inserted into the core member main portion 2310a proximal end first by mating the notch 2311 of the core member distal sealing portion 2310c with the slot 2316b of the core member main portion 2310a. The distal end of the core member proximal sealing portion 2310b and the proximal end of the core member distal sealing portion 2310c could touch or may alternatively have a small space therebetween within the third bore portion 2312c of the core member main portion 2310a. A screw 2350 is then inserted into the bore portions 2312e, 2312f, and 2312h of the core member distal sealing portion 2310c, through the third bore portion 2312c of the core member main portion 2310a, and into the bore 2317 of the core member proximal sealing portion 2310b. Then a nut 2360 is secured to the end of the screw 2350 through the bore 2317 of the core member proximal sealing portion 2310b and tightened such that the sealing portions 2310b, 2310c compress toward one another and tightly seal the gel 700 within the gel-containing portion 2315 at the proximal and distal ends of the outer sheath 2320.

The proximal and distal end caps 2330, 2340 are then secured to the proximal and distal core member sealing portions 2310b, 2310c, respectively. More specifically, the proximal end cap 2330 is placed on the proximal end of the core member proximal sealing portion 2310b to cover the uncovered proximal end of the sealing portion 2310b and allow the release button 2333 to be accessed through the hole 2332. The distal end cap 2322 is secured to the core member distal sealing portion 2310c by engaging the respective notches 2341 with flat portions 2312g of the sealing portion 2310c. At this point the pliable handle 2300 is completely assembled, as shown in FIG. 29, and is ready to be secured to a device. The pliable handle 2300 has been described as having a specific shape and specific details. It is understood that the specific shape and details of the pliable handle 2300 can vary as long as it remains suitable for its intended purpose.

FIG. 30 is a front exploded perspective view of a tenth exemplary embodiment of the pliable handle for use on an object such as a golf club. The pliable handle 3000 is generally formed of a core member 3010, which has a core member main portion 3010a, a core member proximal sealing portion 3010b, and a core member distal sealing portion 3010c, an outer sheath 3020, a proximal end cap 3030, and a distal end cap 3040. Main differences between the pliable handle according to this tenth exemplary embodiment as compared with the pliable handle of the ninth embodiment are orientation and the core member portion 3010.

FIG. 31a shows a front elevation view of the core member main portion 3010a of the pliable handle of FIG. 30. The core member main portion 3010a is substantially cylindrical and has a substantially constant inner diameter throughout much of its longitudinal length. Proximal and distal annular flanges 3013a, 3013b, which partially define a gel-containing portion 3115 therebetween, are provided on the outer surface at respective longitudinal ends of the core member main portion 3010a. The diameters of the proximal and distal annular flanges 3013a, 3013b can be the same as or different from one another, depending on the desired shape of the pliable handle 3000.

FIG. 31b shows a top plan view of the core member main portion 2010a, and FIG. 31c shows a cross-sectional view taken substantially along line 31c—31c of FIG. 31b. A bore 3010, which is concentric with the longitudinal axis of the main portion 3010a, decreases in diameter in a step-wise fashion at the longitudinal end of the main portion 3010a. A first bore portion 3012a has a diameter that is smaller than the diameter of the outer profile of the end of the core member main portion 3010a, and a second bore portion 3012b has a diameter that is smaller than the diameter of the first bore portion 3012a. The second bore portion 3012b has slots 3016, the function of which is described further below, formed in the interior such that the longitudinal axes of the slots 3016 are substantially parallel to the longitudinal axis of the core member main portion 3010a. These slots 3016 may run the full length or a partial length of the core member main portion 3010a. Although a plurality of slots 3016 are shown, it is understood that any number of slots suitable for the intended purpose would suffice. The proximal and distal ends of the core member main portion 3010a are substantially the same, and therefore are interchangeable.

FIG. 32a shows a front elevation view of the core member proximal sealing portion 3010b of the pliable handle of FIG. 30, FIG. 32b shows a top plan view of the core member proximal sealing portion 3010b, and FIG. 32c shows a cross-sectional view taken substantially along line 32c—32c of FIG. 32b. The core member proximal sealing portion 3010b is hollow and cup-like, and has two main sections. Of course the specific shape of the sealing portion 3010b can vary as long as it is suitable for its intended purpose. The first, most proximal section has a round cross-section, and the second, most distal section also has a round cross-section but has a smaller diameter than that of the first section. The first section has a bore portion 3012e, which is concentric with the longitudinal axis of the sealing portion 3010b, two opposing flat portions 3012g, and two opposing notches 3012h. The second section has a bore portion 3012f, a shoulder 3017 defining a hole 3017a, and evenly-spaced ribs 3011. The bore portion 3012f is concentric with the longitudinal axis of the sealing portion 3010b and of the bore portion 3012e, and has a diameter that is smaller than that of the bore portion 3012e. The ribs 3011 are formed on the outer circumference of the second portion, parallel with the longitudinal axis of the sealing portion 2310b, starting from the first section and projecting toward the distal end of the sealing portion 3010b. Although a plurality of ribs 3011 and two flat portions 3012g are shown, any number of ribs and/or flat portions 3012g suitable for the intended purpose would suffice.

FIG. 33 shows front elevation view of the core member distal sealing portion 3010c of the pliable handle of FIG. 30. The core member distal sealing portion 3010c is substantially similar to the core member proximal sealing portion 3010b, except that their orientations are reversed (i.e., the proximal end of the core member distal sealing portion 3010c is the same as the distal end of the core member proximal sealing portion 3010b, and visa versa), and the second section has the ribs 3011 which are longer on the core member distal sealing portion 3010c than on the core member proximal sealing portion 3010b. The core member distal sealing portion 3010c and the core member proximal sealing portion 3010b may be of the same or different lengths. Since many of the other features of the sealing portions 3010b and 3010c are substantially the same, their descriptions will be omitted here for the sake of brevity.

The outer sheath 3020, which is shown in FIG. 30, is shaped to comfortably fit a person's hand. The outer sheath 3020 has at its ends a proximal shoulder 3021 and a distal shoulder 3022, respectively, which may or may not be flanged. The proximal and distal shoulders 3021, 3022 each define a hole provided at the proximal and distal ends, respectively, of the outer sheath 3020. The diameter and shape of each of the proximal and distal shoulders 3021, 3022 corresponds with the diameter and shape of the respective proximal and distal annular flanges 3013a, 3013b of the core member main portion 3010a, such that when the pliable handle 3000 is assembled, the proximal and distal shoulders 3021, 3022 form gel seals with the proximal and distal annular flanges 3013a, 3013b, respectively, due to the intimate fit between these members.

Similar to the outer sheath 3020 of the ninth embodiment, the outer sheath 3020 of this embodiment is provided over the core member main portion 3010a such that the sheath is substantially uniformly disposed about the core member main portion 3010a. Together the outer sheath 3020 and the core member main portion 3010a define a gel-containing portion 3015 therebetween. That is, the gel-containing portion 3015 is defined at its ends by the proximal and distal annular flanges 3013a, 3013b of the core member main portion 3010a, and at its longitudinal faces by the base of the core member main portion 3010a and the outer sheath 3020.

Figure 34A:
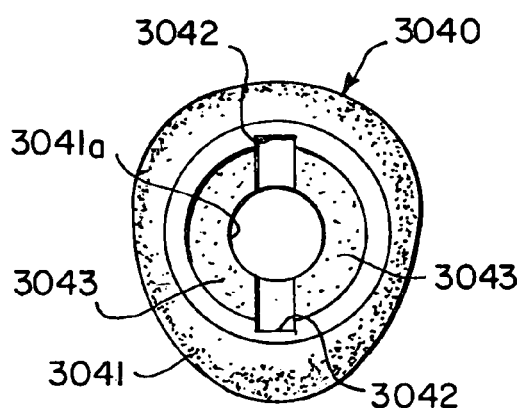
FIG. 34a is a bottom plan view of the distal end cap of the pliable handle of FIG. 30.
Figure 34B:
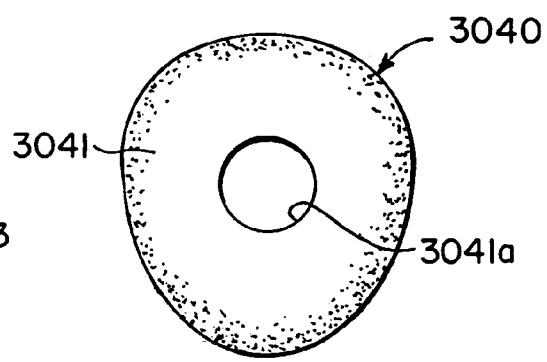
FIG. 34b is a top plan view of the distal end cap of the pliable handle of FIG. 30.

FIGS. 34a and 34b show bottom and top plan views, respectively, of the distal end cap 3040 of the pliable handle shown in FIG. 30. The distal end cap 3040 is substantially egg-shaped in cross-section (but of course may have any other suitable cross-section) and cup-like with two open ends. The distal open end of the cap 3040 has a shoulder 3041 defining a round hole 3041a, which permits insertion of a pole or device to which the pliable handle 3000 will be attached. The proximal open end has a circular profile and has within its inner circumference two opposing slots 3042, which are parallel with the longitudinal axis of the distal end cap 3040, and two opposing flat portions 3043 (which cannot be seen in the figure), the securing function of which will be described further below. The profile of the proximal end is substantially similar to the profile of the distal shoulder 3021 of the outer sheath 3020.

Figure 35A:
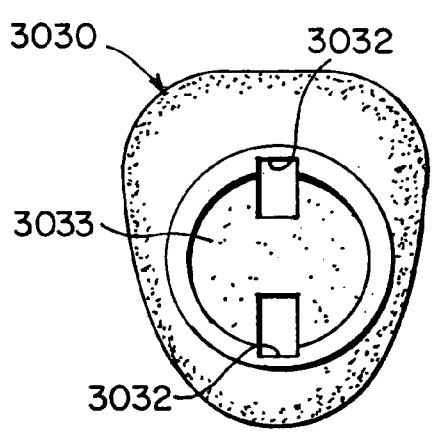
FIG. 35a is a bottom plan view of the proximal end cap of the pliable handle of FIG. 30.
Figure 35B:
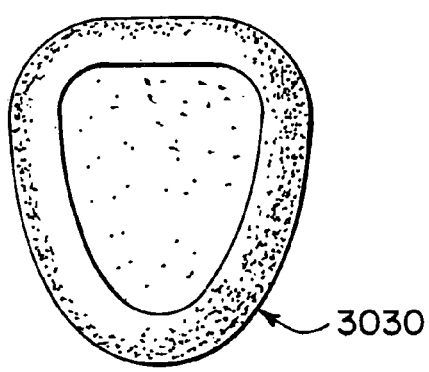
FIG. 35b is a top plan view of the proximal end cap of the pliable handle of FIG. 30.

FIGS. 35a and 35b show bottom and top plan views, respectively, of the proximal end cap 3030 of the pliable handle of FIG. 30. The proximal end cap 3030 is substantially egg-shaped in cross-section (but of course may be of any other suitable cross-section) and cup-like. The proximal end cap 3030 has an open end and a closed end. The open end has a circular profile and has formed within the inner circumference two opposing slots 3032, which are parallel with the longitudinal axis of the proximal end cap 3030, and two opposing flat portions 3033 (which cannot be seen in the figure), the securing function of which will be described further below. Of course, any number of slots, flat portions, and/or other securing means suitable for the intended purpose would suffice.

One exemplary method for assembling the pliable handle 3000 will now be described. During assembly, the outer sheath 3020 is placed over the core member main portion 3010a such that gel seals are formed by the proximal and distal shoulders 3021, 3022 of the outer sheath 3020 coupling with the respective shoulders 3013a, 3013b of the core member main portion 3010a. The gel-containing portion 3015 is thereby defined at its ends by the proximal and distal annular flanges 3013a, 3013b of the core member main portion 3010a, and at its longitudinal faces by the base of the core member main portion 3010a and the outer sheath 3020.

After the outer sheath 3020 is placed over the core member 3010a, similar to the ninth embodiment described above, one end of the outer sheath 3020 is pulled back and gel is injected into the gel-containing portion 3015 using an injection nozzle. When the gel-containing portion 3015 is filled with gel 700, the injection nozzle is removed. Of course other means and methods for inserting the gel 700 may be employed, as described above with respect to other embodiments.

The core member proximal sealing portion 3010b and core member distal sealing portion 3010c are then secured to the core member main portion 3010a. More specifically, the core member proximal sealing portion 3010b is inserted distal end first into the core member main portion 3010a by mating the ribs 3011 of the core member proximal sealing portion 3010b with the slots 3016 of the core member main portion 3010a. Also, the core member distal sealing portion 3010c is inserted into the core member main portion 3010a proximal end first by mating the ribs 3011 of the core member distal sealing portion 3010c with the slots 3016 of the core member main portion 3010a. The distal end of the core member proximal sealing portion 3010b and the proximal end of the core member distal sealing portion 3010c could touch or may alternatively have a small space therebetween within the core member main portion 3010a.

A screw 3050 is inserted through the bore 3017 and into the hole 3017a of the core member distal sealing portion 3010c and then into the hole 3017a of the core member proximal sealing portion 3010b. Then a nut 3060 is secured to the end of the screw 3050 through the bore 3017 of the core member proximal sealing portion 3010b and tightened such that the sealing portions 3010b, 3010c compress toward one another and tightly seal the gel 700 within the gel-containing portion 3015 at the proximal and distal ends of the outer sheath 3020.

Figure 36:
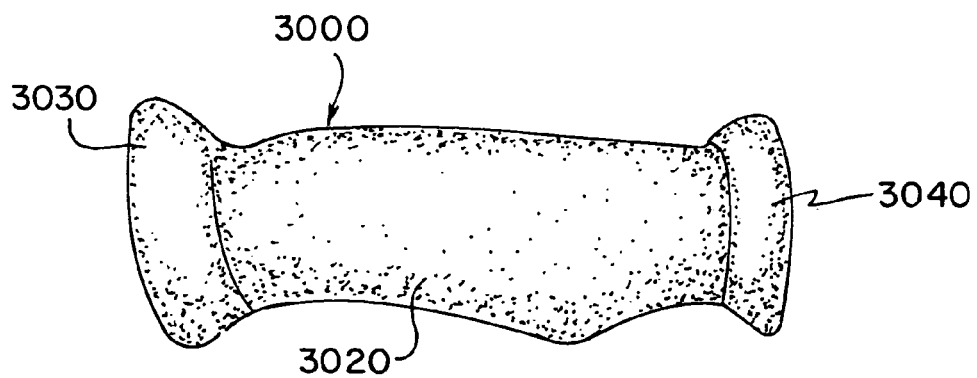
FIG. 36 is a side elevation view of the assembled pliable handle of FIG. 30.

The proximal and distal end caps 3030, 3040 are then secured to the proximal and distal core member sealing portions 3010b, 3010c, respectively. More specifically, the proximal end cap 3030 is secured to the core member proximal sealing portion 3010b such that the notches of 3012h of the core member proximal sealing portion 3010b engage with the slots 3032 of the proximal end cap 3030, and the flat portions 3012g of the core member proximal sealing portion 3010b engage with the flat portions 3033 of the proximal end cap 3030. Similarly, the distal end cap 3022 is secured to the core member distal sealing portion 3010c such that the notches of 3012h of the core member distal sealing portion 3010c engage with the slots 3042 of the distal end cap 3000, and the flat portions 3012g of the core member distal sealing portion 3010c engage with the flat portions 3043 of the distal end cap 3030. At this point the pliable handle 3000 is completely assembled, as shown in FIG. 36, and is ready to be secured to a device. The pliable handle 3000 has been described as having a specific shape and specific details. It is understood that the specific shape and details of the pliable handle 3000 can vary as long as it remains suitable for its intended purpose.

As may be appreciated, the pliable handle may be formed of any of a number of different sizes and/or shapes, such as curved, straight, contoured, or tapered, so long as the pliable handle is suitable for its intended purpose.

Throughout the description the words "proximal" and "distal" have been used to describe components or portions of components. These words were used merely to aid the reader in an understanding of the invention and are not intended to be limiting.

While this invention has been particularly shown and described with references to preferred embodiments thereof, it will be understood by those skilled in the art that various changes in form and details may be made therein without departing from the scope of the invention encompassed by the appended claims.

What is claimed is:

1. A pliable handle comprising:
   a tubular core member having first and second annular flanges at or near respective ends of the tubular core member which partially define a gel-containing portion therebetween;
   a deformable outer sheath disposed about the tubular core member;
   a gel disposed between the tubular core member and the outer sheath; and
   first and second sealers at respective ends of the tubular core member for sealing the gel between the tubular core member and the outer sheath, wherein a force applied to the outer sheath causes load movement of the gel.

2. The pliable handle of claim 1, wherein the deformable outer sheath has a shoulder at or near each end, and each shoulder is compressed between a respective one of the first and second sealers and a respective one of the first and second flanges.

3. The pliable handle of claim 1, wherein the outer sheath has first and second shoulders at or near respective ends thereof, and the diameters of each of the first and second shoulders of the outer sheath correspond with the diameters of the respective first and second annular flanges of the tubular core member.

4. The pliable handle of claim 1, wherein the first sealer has a side access hole.

5. The pliable handle of claim 4, wherein the side access hole permits access to an umbrella canopy release button.

6. The pliable handle of claim 1, wherein the first and second sealers are coupled together through a center of the tubular core member.

7. The pliable handle of claim 6, wherein the first and second sealers are coupled together by a screw and nut.

8. The pliable handle of claim 1, wherein the deformable outer sheath and gel together have a memory effect causing a deformation to remain for a period of time before the sheath returns substantially to its original shape.

9. The pliable handle of claim 1, wherein the gel is in intimate contact with the tubular core member.

10. The pliable handle of claim 1, wherein the tubular core member and first and second sealers are formed of a material selected from the group consisting of PVC, ABS, PE, and PP plastic.

11. The pliable handle of claim 1, wherein the outer sheath is substantially cylindrical in shape.

12. The pliable handle of claim 1, wherein the outer sheath is formed of vulcanized silicone.

13. The pliable handle of claim 1, wherein the gel is uniformly disposed about the tubular core member.

14. The pliable handle of claim 1, wherein the sheath is uniformly disposed about the tubular core member substantially from a first to a second end of the gel-containing portion.

15. The pliable handle of claim 1, wherein the pliable handle is an umbrella handle.

16. The pliable handle of claim 1, wherein the pliable handle is a golf dub handle.

17. The pliable handle of claim 1, wherein the pliable handle is selected from the group consisting of a handle of a cane, walking stick, sports equipment, garden equipment, tool, cleaning equipment, writing instrument, and beauty equipment.

18. The pliable handle of claim 1, wherein the outer sheath has ribs formed on the outer surface thereof.

19. The pliable handle of claim 18, wherein the ribs are sized and spaced such that fingers may be placed comfortably within the spaces between the ribs.

20. The pliable handle of claim 1, wherein the sealers are inserted into the respective ends of the core member.

21. The pliable handle of claim 20, wherein the sealers seal the gel between the tubular core member and the outer sheath.

22. A pliable handle comprising:
   a tubular core member;
   a deformable outer sheath disposed about the tubular core member;
   a gel disposed between the tubular core member and the outer sheath; and
   first and second sealing means, which are inserted into respective ends of the tubular core member, for sealing the gel between the tubular core member and the outer sheath,
   wherein a force applied to the outer sheath causes load movement of the gel.

* * * * *